United States Patent
Shimada et al.

(10) Patent No.: US 7,971,740 B2
(45) Date of Patent: Jul. 5, 2011

(54) PRESSURE VESSEL

(75) Inventors: Toshiaki Shimada, Wako (JP); Yasuji Kawamata, Oyama (JP)

(73) Assignees: Honda Motor Co., Ltd., Tokyo (JP); Showa Denko K.K., Tokyo (JP)

( * ) Notice: Subject to any disclaimer, the term of this patent is extended or adjusted under 35 U.S.C. 154(b) by 800 days.

(21) Appl. No.: 11/571,726

(22) PCT Filed: Jun. 29, 2005

(86) PCT No.: PCT/JP2005/012434
§ 371 (c)(1),
(2), (4) Date: Jan. 5, 2007

(87) PCT Pub. No.: WO2006/004136
PCT Pub. Date: Jan. 12, 2006

(65) Prior Publication Data
US 2007/0246461 A1    Oct. 25, 2007

Related U.S. Application Data

(60) Provisional application No. 60/586,720, filed on Jul. 12, 2004, provisional application No. 60/598,051, filed on Aug. 3, 2004, provisional application No. 60/598,052, filed on Aug. 3, 2004.

(30) Foreign Application Priority Data

Jul. 6, 2004    (JP) .................... 2004-198883
Jul. 29, 2004    (JP) .................... 2004-221369
Jul. 29, 2004    (JP) .................... 2004-221385

(51) Int. Cl.
*B65D 6/00*    (2006.01)

(52) U.S. Cl. .................... 220/4.12; 220/23.83

(58) Field of Classification Search .............. D9/737, D9/691, 690, 682; 220/4.16, 4.12, 4.08, 220/4.04, 4.27, 4.26, 23.88, 23.89, 504, 503, 220/501, 526, 523, 588, 586, 62.19, 23.83, 220/23.2, 4.01, 200, 241, FOR. 126, 565, 220/505, 676, 675, 669, 623, 610, 636, 635, 220/634, 601, 661, 660; 206/0.6; 210/533, 210/532.1, 173; D23/205, 203, 202

See application file for complete search history.

(56) References Cited

U.S. PATENT DOCUMENTS 1,630,037 A * 5/1927 Stresau ................. 220/4.12
(Continued)

FOREIGN PATENT DOCUMENTS

| DE | 3103646 | 8/1982 |
|----|---------|--------|
| GB | 1 567 814 | 5/1980 |
| JP | 07-243588 | 9/1995 |

(Continued)

OTHER PUBLICATIONS

Translation of JP 2005061474 (Sugano et al.), Mar. 10, 2005, Paragraph 82 Lines 5-7, and Paragraph 95 Lines 1-8.*
Office Action mailed Sep. 7, 2010 in corresponding Japanese application 2005-194954, filed Jul. 4, 2005.
Office Action mailed Sep. 9, 2008 in corresponding Japanese application 2004-221369, filed Jul. 29, 2004.
Office Action mailed Sep. 9, 2008 in corresponding Japanese application 2004-221385, filed Jul. 29, 2004.

*Primary Examiner* — Anthony Stashick
*Assistant Examiner* — Robert J Hicks
(74) *Attorney, Agent, or Firm* — Oblon, Spivak, McClelland, Maier & Neustadt, L.L.P.

(57) ABSTRACT

A pressure vessel arranging and integrating a plurality of vessel structures each including a cylindrical liner opened at both ends and a fiber reinforced resin layer covering the outer periphery of the peripheral wall of the liner. Dome-shaped communicating members bulging outward are fixed across both respective ends of the liners of the vessel structures, thereby making the interiors of these liners communicate with each other and closing the open ends of these liners. This pressure vessel can be installed with no wasted space, and also allows an increase in capacity.

19 Claims, 16 Drawing Sheets

U.S. PATENT DOCUMENTS

| | | | |
|---|---|---|---|
| 2,060,155 A * | 11/1936 | Wilhelm | 220/592.27 |
| 2,341,044 A * | 2/1944 | Jackson et al. | 220/584 |
| 2,834,702 A * | 5/1958 | Gibb | 220/562 |
| 3,166,212 A * | 1/1965 | Resos | 220/23.4 |
| 3,282,459 A * | 11/1966 | Wilson | 220/585 |
| 4,022,343 A * | 5/1977 | Richardson | 206/521 |
| 4,112,644 A * | 9/1978 | Allen | 52/245 |
| 4,561,568 A * | 12/1985 | Hoffmeister et al. | 222/130 |
| 5,383,566 A * | 1/1995 | Johnson | 220/562 |
| 5,577,630 A | 11/1996 | Blair et al. | |
| 6,095,367 A | 8/2000 | Blair et al. | |
| 6,398,055 B1 * | 6/2002 | Ostholt | 220/23.4 |
| 6,412,650 B1 | 7/2002 | Warner | |
| 2004/0108098 A1 | 6/2004 | Sanders | |
| 2007/0158343 A1 * | 7/2007 | Shimada et al. | 220/4.14 |
| 2008/0105581 A1 * | 5/2008 | Kondo et al. | 206/438 |

FOREIGN PATENT DOCUMENTS

| | | |
|---|---|---|
| JP | 9-42595 | 2/1997 |
| JP | 09-112796 | 5/1997 |
| JP | 10-119138 | 5/1998 |
| JP | 10-513420 | 12/1998 |
| JP | 2001-317689 | 11/2001 |
| JP | 2002-528331 | 9/2002 |
| JP | 2002-543355 | 12/2002 |
| JP | 2004-017669 | 1/2004 |
| JP | 2005061474 A * | 3/2005 |
| JP | 2005221045 A * | 8/2005 |
| WO | WO 96/23721 | 8/1996 |
| WO | WO 00/24608 | 5/2000 |
| WO | WO 00/24641 | 5/2000 |
| WO | WO 00/24669 | 5/2000 |
| WO | WO 00/66940 | 11/2000 |

* cited by examiner

US 7,971,740 B2

PRESSURE VESSEL

CROSS REFERENCE TO RELATED APPLICATIONS

This application is an application filed under 35 U.S.C. §111(a) claiming the benefit pursuant to 35 U.S.C. §119(e)(1) of the filing dates of Provisional Applications Nos. 60/586,720, 60/598,051, and 60/598,052 filed Jul. 12, 2004, Aug. 3, 2004, and Aug. 3, 2004, respectively, pursuant to 35 U.S.C. §111(b).

TECHNICAL FIELD

The present invention relates to pressure vessels for use as pressure vessels for storing hydrogen gas or natural gas serving as a fuel for power generation, or for storing oxygen gas, for example, in the automobile industry, housing industry, military industry, aerospace industry, medical industry, etc.

The term "aluminum" as used herein and in the appended claims includes aluminum alloys in addition to pure aluminum.

BACKGROUND ART

In order to control air pollution, efforts have been made in recent years for developing natural gas motor vehicles and fuel cell motor vehicles which produce clean emissions. These motor vehicles have installed therein a pressure vessel containing fuel natural gas or hydrogen gas to a high pressure.

Among conventionally-known liners for use in such a pressure vessel is one comprising a cylindrical trunk and head plates for sealing openings in both ends of the trunk. The liner is composed of: a first liner component which is made of an aluminum extrudate, has the shape of a cylinder opened at both ends, and forms the trunk; and two second liner components which are made of die-cast aluminum, are generally dome-shaped, and are welded to both ends of the first liner component to form the head plates. A plurality of reinforcing walls are integrally formed on the inner periphery of the first liner component to a radial pattern in cross section. Reinforcing walls are integrally formed on the inner peripheries of the second liner components at positions corresponding to the reinforcing walls of the first liner component (for example, see JP-A No. 9-42595).

For use as a pressure vessel, the pressure vessel liner described in the foregoing publication is provided with: a helical winding fiber reinforced resin layer formed by winding a reinforcing fiber across both the second liner components in the longitudinal direction of the first liner component, and impregnating and fixing the same with an epoxy resin; and a hooped fiber reinforced resin layer formed by winding a reinforcing fiber around the first liner component in the peripheral direction thereof, and impregnating and fixing the same with an epoxy resin.

By the way, motor vehicles require pressure vessels of higher capacities for the sake of extended cruising distances. In the pressure vessel using the pressure vessel liner described in the foregoing publication, a higher capacity can be achieved by increasing the diameter of the trunk and increasing the length thereof. Since motor vehicles have limitations in vehicle width, and thus also have limitations in increasing the length of the trunk, the higher capacity of the pressure vessel must be achieved by increasing the diameter of the trunk. When the diameter of the trunk is increased, however, it is impossible to make effective use of free spaces existing in motor vehicles. This gives rise to the problem of causing wasted space in the car-mounted state and deteriorating the comfort of the cabins. There is also the problem that increasing the diameter of the trunk requires a greater vehicle height and thus precludes use with motor vehicles of smaller heights such as a sedan.

An object of the present invention is to overcome the forgoing problems and provide a pressure vessel which can be installed with no wasted space and can achieve an increase in capacity.

DISCLOSURE OF THE INVENTION

To achieve the foregoing object, the present invention comprises the following modes.

1) A pressure vessel comprising a plurality of vessel structures arranged and integrated with each other, the vessel structures each being composed of a cylindrical liner opened at least at one of its ends and a fiber reinforced resin layer covering an outer periphery of a peripheral wall of the liner, and wherein: interiors of the liners of all the vessel structures are put in communication with each other; the liners of all the vessel structures form a single closed space; and the pressure vessel has a mouth portion for making the closed space communicate with exterior.

2) A pressure vessel according to par. 1), wherein the number of the mouth portion is one.

3) A pressure vessel according to par. 1), wherein: at least two adjoining vessel structures are arranged so that the open ends of their liners fall on the same side; and a dome-shaped communicating member bulging outward is fixed across the open ends of the liners of these vessel structures, whereby the interiors of the liners are put in communication with each other and the openings in the liners are closed.

4) A pressure vessel according to par. 3), wherein: an end plate is stationarily formed across the open ends of the liners of at least two adjoining vessel structures arranged so that the open ends fall on the same side; and a rim part of the dome-shaped communicating member is joined to a rim part of the end plate.

5) A pressure vessel according to par. 4), wherein the end plate is formed by joining external flanges to each other, the external flanges being integrally formed on the open ends of the liners.

6) A pressure vessel according to par. 5), wherein: the liners and the external flanges are made of aluminum; and the external flanges are joined to each other by friction agitation.

7) A pressure vessel according to par. 4), wherein: the end plate is made of a single plate having through holes for the open ends of the liners to be fitted into; and areas of the plate around the through holes and the open ends of the liners are joined to each other.

8) A pressure vessel according to par. 7), wherein: the liners and the plate are made of aluminum; and the liners and the plate are joined by friction agitation.

9) A pressure vessel according to par. 4), wherein: the dome-shaped communicating member and the end plate are made of aluminum; and the dome-shaped communicating member and the end plate are joined by friction agitation.

10) A pressure vessel according to par. 3), wherein: a plate-like connecting member is arranged between the open ends of the liners of at least two adjoining vessel structures arranged so that the open ends fall on the same side, the connecting member having notches for the open ends of the liners on both sides to be fitted to; areas of the connecting member around the notches and the open ends of the liners are joined to each other; and a rim part of the dome-shaped communicating member is joined to the connecting member and the open ends of the liners.

11) A pressure vessel according to par. 10), wherein: the liners and the connecting member are made of aluminum; and the liners and the connecting member are joined by friction agitation.

12) A pressure vessel according to par. 10), wherein: the dome-shaped communicating member, the liners, and the connecting member are made of aluminum; and the dome-shaped communicating member, the liners, and the connecting member are joined by friction agitation.

13) A pressure vessel according to par. 3), wherein a reinforcing wall is stationarily formed in the dome-shaped communicating member.

14) A pressure vessel according to par. 13), wherein: the open ends of the liners of at least two adjoining vessel structures arranged so that the open ends fall on the same side are connected to each other by a connecting part; and at least one reinforcing wall of the communicating member and the connecting part are connected to each other.

15) A pressure vessel according to par. 14), wherein at least one reinforcing wall of the communicating member and the connecting part are connected to each other by engagement.

16) A pressure vessel according to par. 14), wherein at least one reinforcing wall of the communicating member and the connecting part are connected to each other by metallurgical joint or adhesive bonding.

17) A pressure vessel according to par. 3), wherein: the liners are opened at both ends, and the liners of all the vessel structures have the same length; dome-shaped communicating members bulging outward are fixed across the ends of the liners of all the vessel structures at respective ends; and a mouth portion is formed on at least either one of the dome-shaped communicating members.

18) A pressure vessel according to par. 1), wherein the liner of at least one vessel structure out of all the vessel structures has a different length.

19) A pressure vessel according to par. 1), wherein the liners of all the vessel structures have the same diameter.

20) A pressure vessel according to par. 1), wherein the liner of at least one vessel structure out of all the vessel structures has a different diameter.

21) A pressure vessel according to par. 1), comprising a secondary fiber reinforced resin layer formed across all the vessel structures.

22) A pressure vessel according to par. 21), wherein the secondary fiber reinforced resin layer comprises: an in-plane winding fiber layer formed by winding a reinforcing fiber in parallel with an axial direction of the liners; a helical winding fiber layer formed by winding a reinforcing fiber obliquely to the axial direction of the liners; a hooped fiber layer formed by winding a reinforcing fiber perpendicularly to the axial direction of the liners; and a resin with which the fiber layers are impregnated before cured.

23) A pressure vessel according to par. 22), wherein means for avoiding a slip while winding the reinforcing fibers for forming the in-plane winding fiber layer and the helical winding fiber layer of the secondary fiber reinforced resin layer are arranged on both ends.

24) A fuel cell system comprising a fuel hydrogen pressure vessel, a fuel cell, and pressure piping for sending fuel hydrogen gas from the fuel hydrogen pressure vessel to the fuel cell therethrough, the fuel hydrogen pressure vessel comprising a pressure vessel according to any one of pars. 1) to 23).

25) A fuel cell motor vehicle having installed therein a fuel cell system according to par. 24).

26) A cogeneration system comprising a fuel cell system according to par. 24).

27) A natural gas supply system comprising a natural gas pressure vessel, and pressure piping for sending out natural gas from the natural gas pressure vessel therethrough, the natural gas pressure vessel comprising a pressure vessel according to any one of pars. 1) to 23).

28) A cogeneration system comprising a natural gas supply system according to par. 27), a generator, and a generator drive device.

29) A natural gas motor vehicle comprising a natural gas supply system according to par. 27), and an engine for use with natural gas as a fuel.

30) An oxygen gas supply system comprising an oxygen pressure vessel, and pressure piping for sending out oxygen gas from the oxygen pressure vessel therethrough, the oxygen pressure vessel comprising a pressure vessel according to any one of pars. 1) to 23).

The pressure vessel according to par. 1) is constituted by arranging and integrating the plurality of vessel structures each composed of a cylindrical liner opened at least at one of its ends and a fiber reinforced resin layer covering the outer periphery of the peripheral wall of the liner. The interiors of the liners of all the vessel structures are put in communication with each other, the liners of all the vessel structures form a single closed space, and the pressure vessel has the mouth portion for making the closed space communicate with exterior. Consequently, the diameters and lengths of the individual vessel structures, and the arrangement of all the vessel structures can be changed as appropriate according to the available space in an intended apparatus, e.g., a motor vehicle. This allows installation with no wasted space, and achieves an increase in capacity. Moreover, since the outer peripheries of the peripheral walls of the liners of the vessel structures are covered with the fiber reinforced resin layer, the pressure resistance is also improved.

In the pressure vessel according to par. 2), the number of the mouth portion is one. This only requires a single valve to be used, allowing a reduction in cost.

In the pressure vessel according to par. 3), the communicating member makes the interiors of the liners of at least two adjoining vessel structures communicate with each other. A single closed space can thus be formed relatively easily.

In the pressure vessel according to par. 4), the dome-shaped communicating member can be fixed across the open ends of the liners of at least two adjoining vessel structures relatively easily.

In the pressure vessel according to par. 5), the end plate can be formed relatively easily.

In the pressure vessel according to par. 6), the external flanges can be firmly joined to each other.

In the pressure vessel according to par. 7), the end plate can be formed relatively easily.

In the pressure vessel according to par. 8), the liners and the plate can be joined firmly.

In the pressure vessel according to par. 9), the dome-shaped communicating member and the end plate can be joined firmly.

In the pressure vessel according to par. 10), the dome-shaped communicating member can be fixed across the open ends of the liners of at least two adjoining vessel structures relatively easily.

In the pressure vessel according to par. 11), the liners and the connecting member can be joined firmly.

In the pressure vessel according to par. 12), the dome-shaped communicating member, the liners, and the connecting member can be joined firmly.

In the pressure vessel according to par. 13), the reinforcing wall is stationarily formed in the dome-shaped communicating member. The dome-shaped communicating member thus improves in pressure resistance, and can be made relatively smaller in thickness for the sake of weight saving of the pressure vessel.

In the pressure vessels according to par. 14) to 16), the open ends of the liners of at least two adjoining vessel structures are connected to each other by the connecting part, and at least one reinforcing wall of the communicating member is connected to the connecting part. Thus, even when a large force acts in the longitudinal direction, the fixed part of the dome-shaped communicating member is prevented from stress concentration. This increases the pressure resistance against forces in the longitudinal direction.

In the pressure vessel according to par. 23), the reinforcing fibers for forming the in-plane winding fiber layer and the helical winding fiber layer of the secondary fiber reinforced resin layer can be wound by simple operations, and it is possible to avoid a slip of the reinforcing fibers. In addition, since the reinforcing fibers for forming the in-plane winding fiber layer and the helical winding fiber layer of the secondary fiber reinforced resin layer are prevented from slipping, the pressure vessel provides an excellent pressure resistance in the longitudinal direction.

BEST MODE FOR CARRYING OUT THE INVENTION

Figure 1:
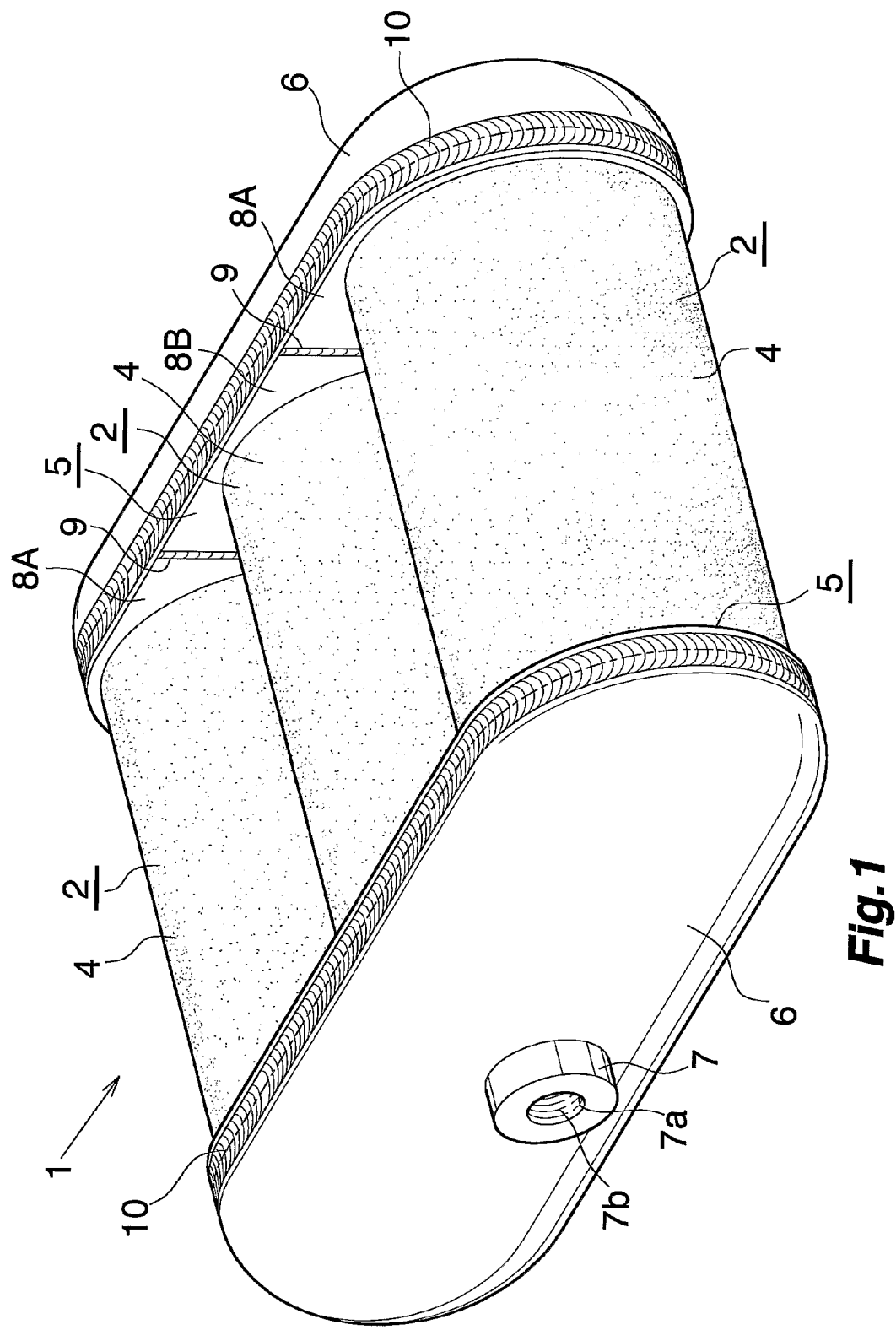
FIG. 1 is a perspective view showing a pressure vessel according to embodiment 1 of this invention.

Hereinafter, embodiments of this invention will be described with reference to the drawings.

Incidentally, identical parts and identical objects will be designated by like reference numerals throughout all the drawings. Redundant description thereof will be omitted.

Moreover, in the following description, the right and the left shall refer to the right and the left in FIGS. 2, 9, and 15. The front shall refer to the bottom in the same figures (the right in FIG. 16), and the back the opposite side. Besides, the top and the bottom shall refer to the top and the bottom in FIG. 3.

Embodiment 1

Figure 2:
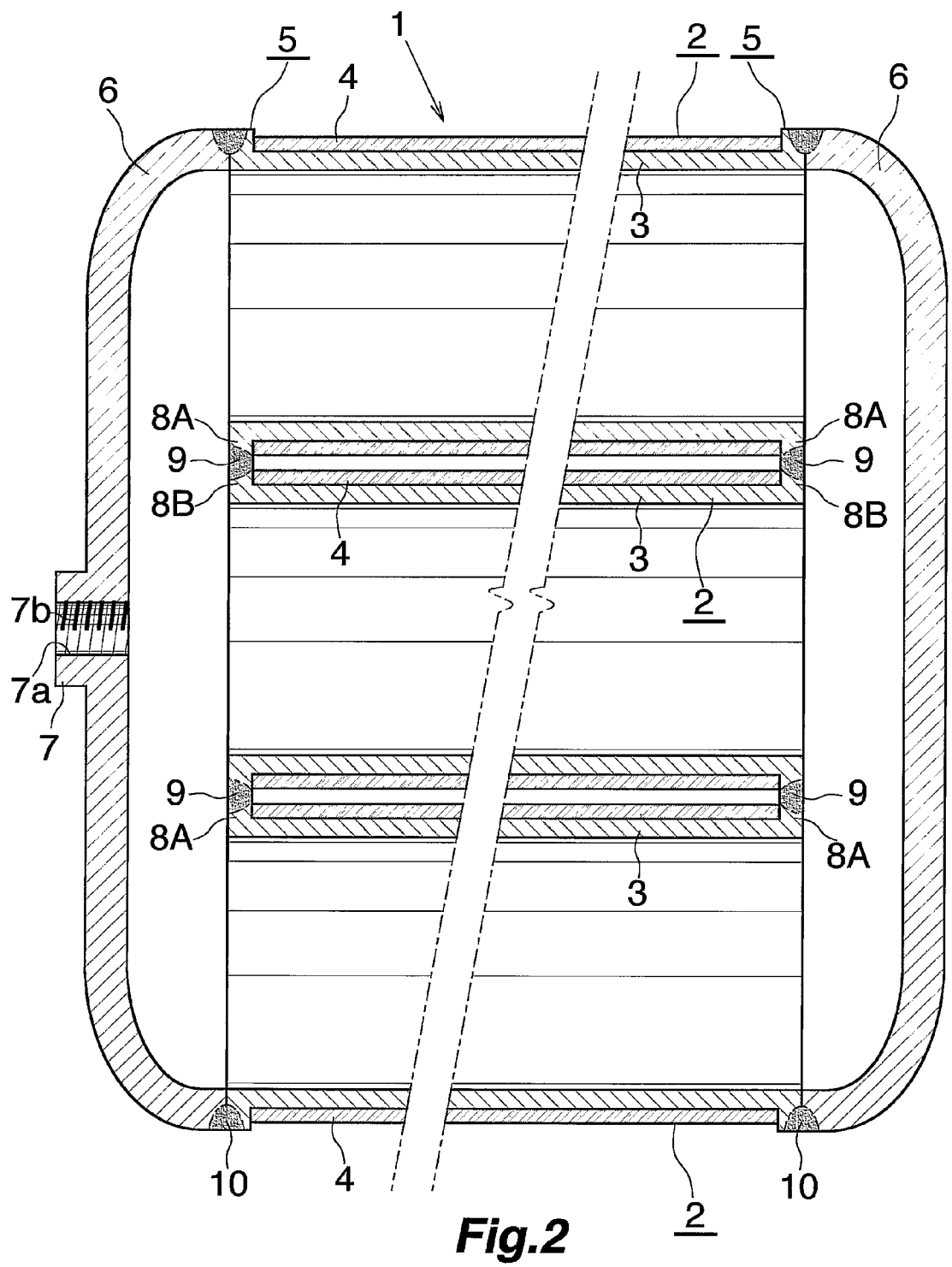
FIG. 2 is a horizontal sectional view of the pressure vessel according to embodiment 1.
Figure 3:
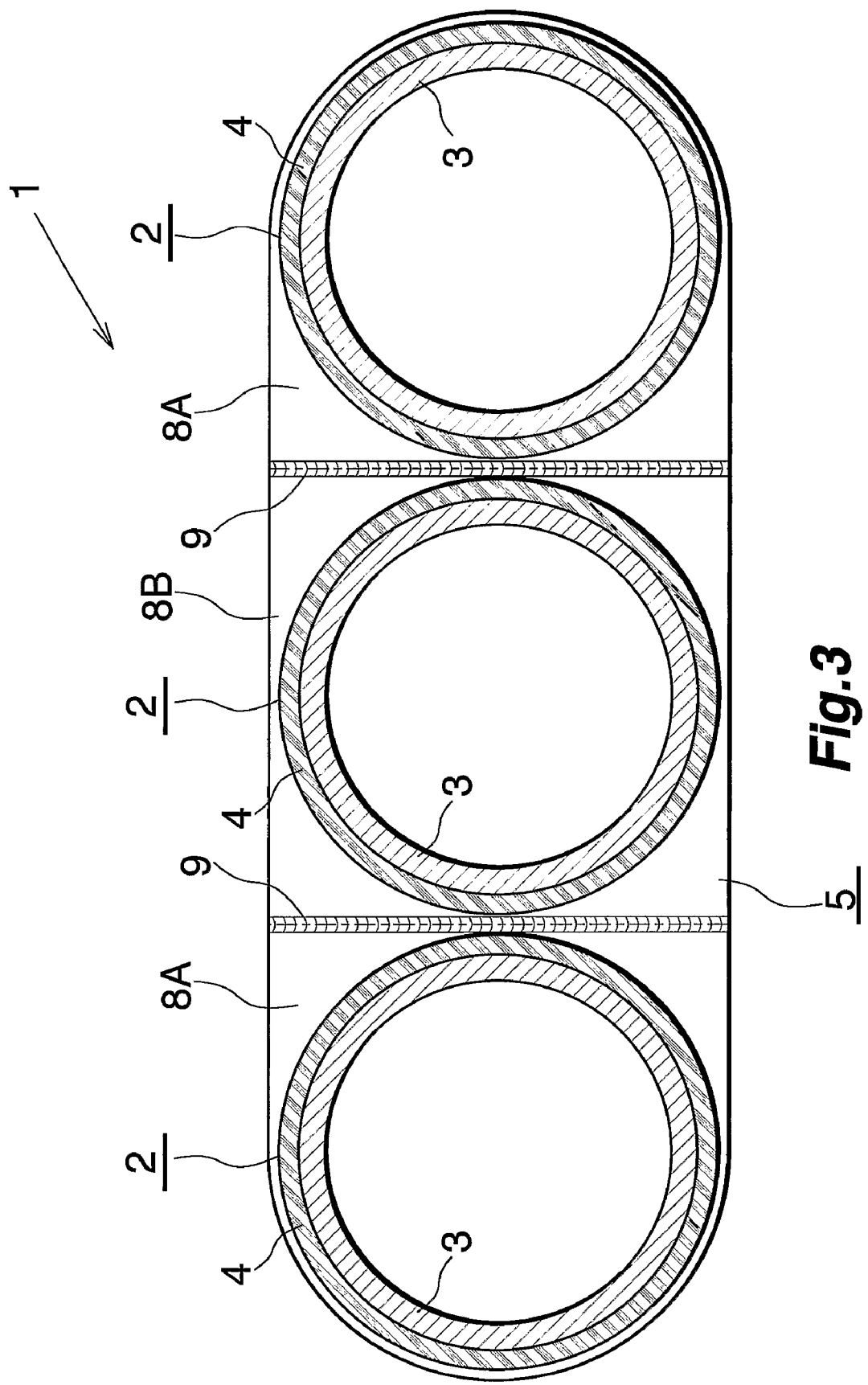
FIG. 3 is across-sectional view of the pressure vessel according to embodiment 1.
Figure 4:
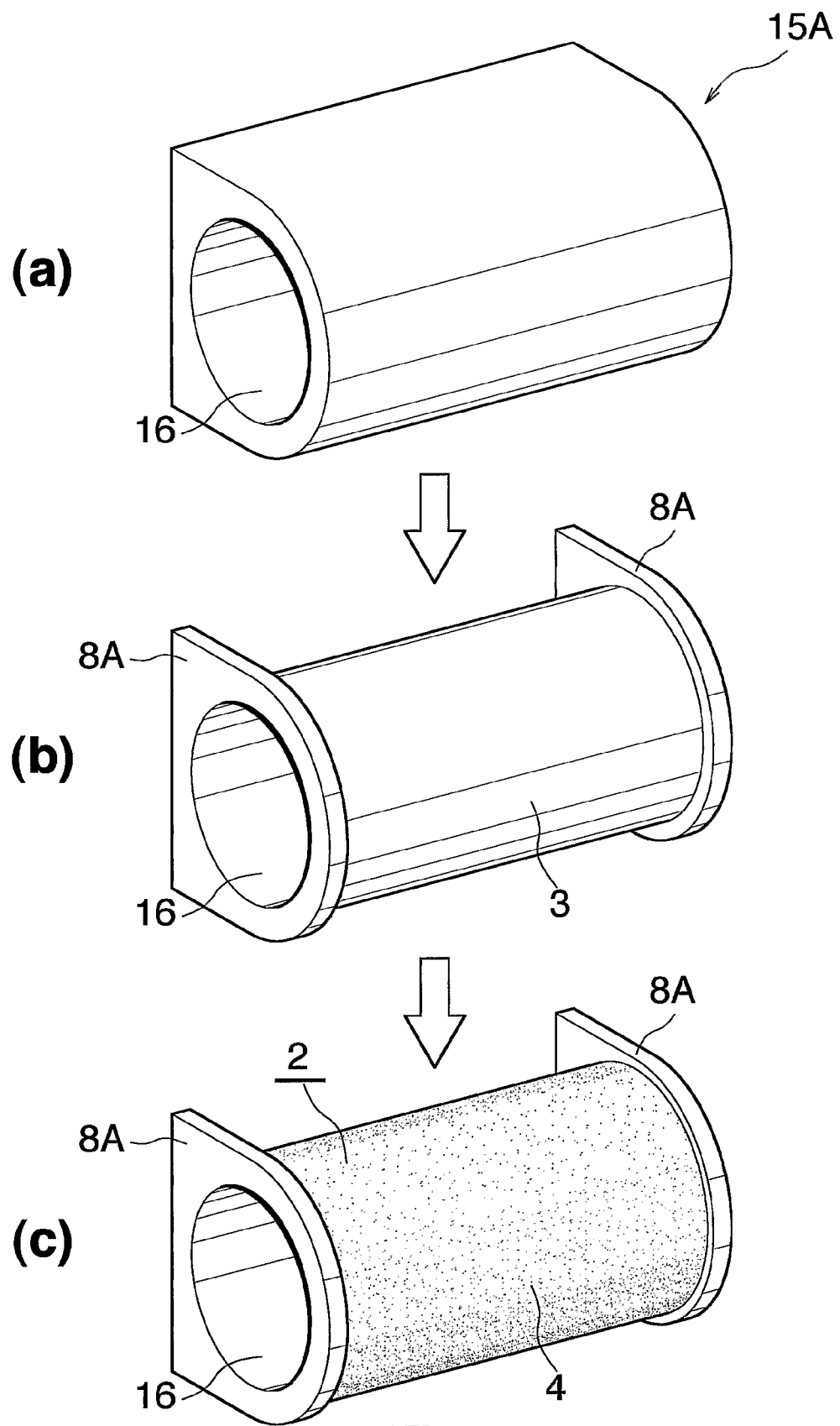
FIG. 4 is a perspective view showing the method of fabricating a vessel structure to be located at an end in the direction of arrangement of the vessel structures in the pressure vessel according to embodiment 1.
Figure 5:
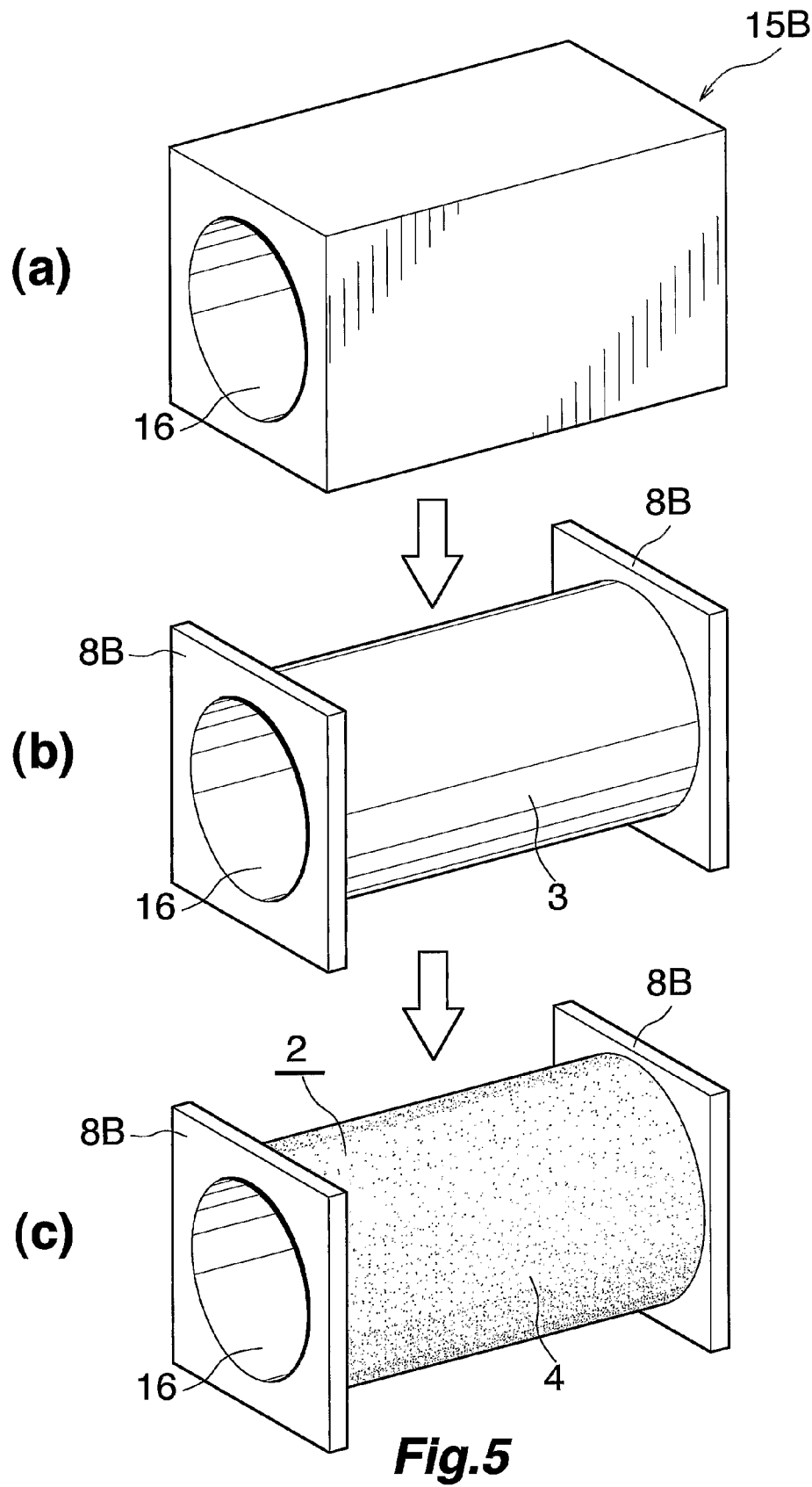
FIG. 5 is a perspective view showing the method of fabricating a vessel structure to be located at the center in the direction of arrangement of the vessel structures in the pressure vessel according to embodiment 1.
Figure 6:
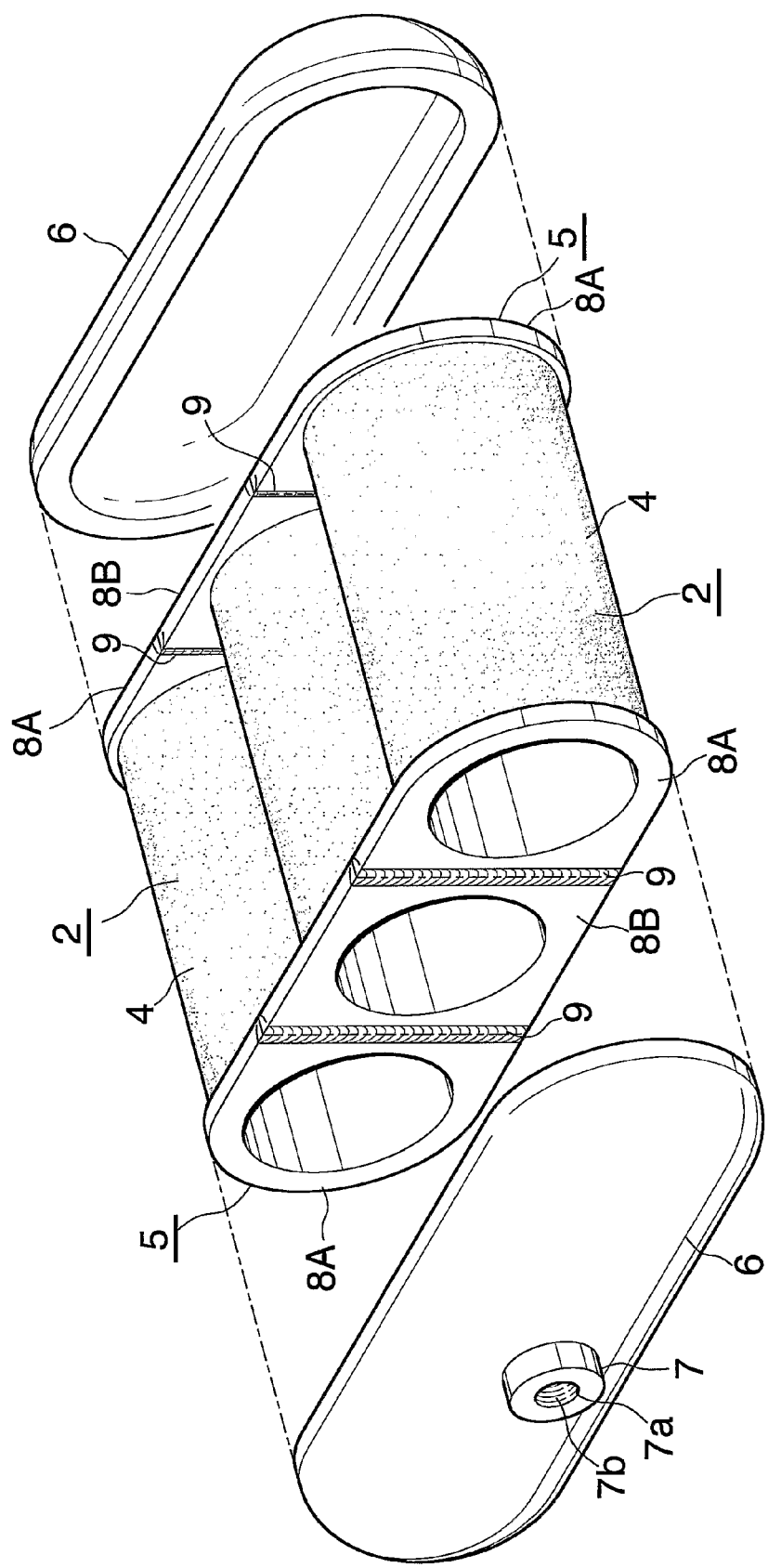
FIG. 6 is a perspective view showing a state where communicating members are jointed to a plurality of connected and integrated vessel structures in the pressure vessel according to embodiment 1.
Figure 7:
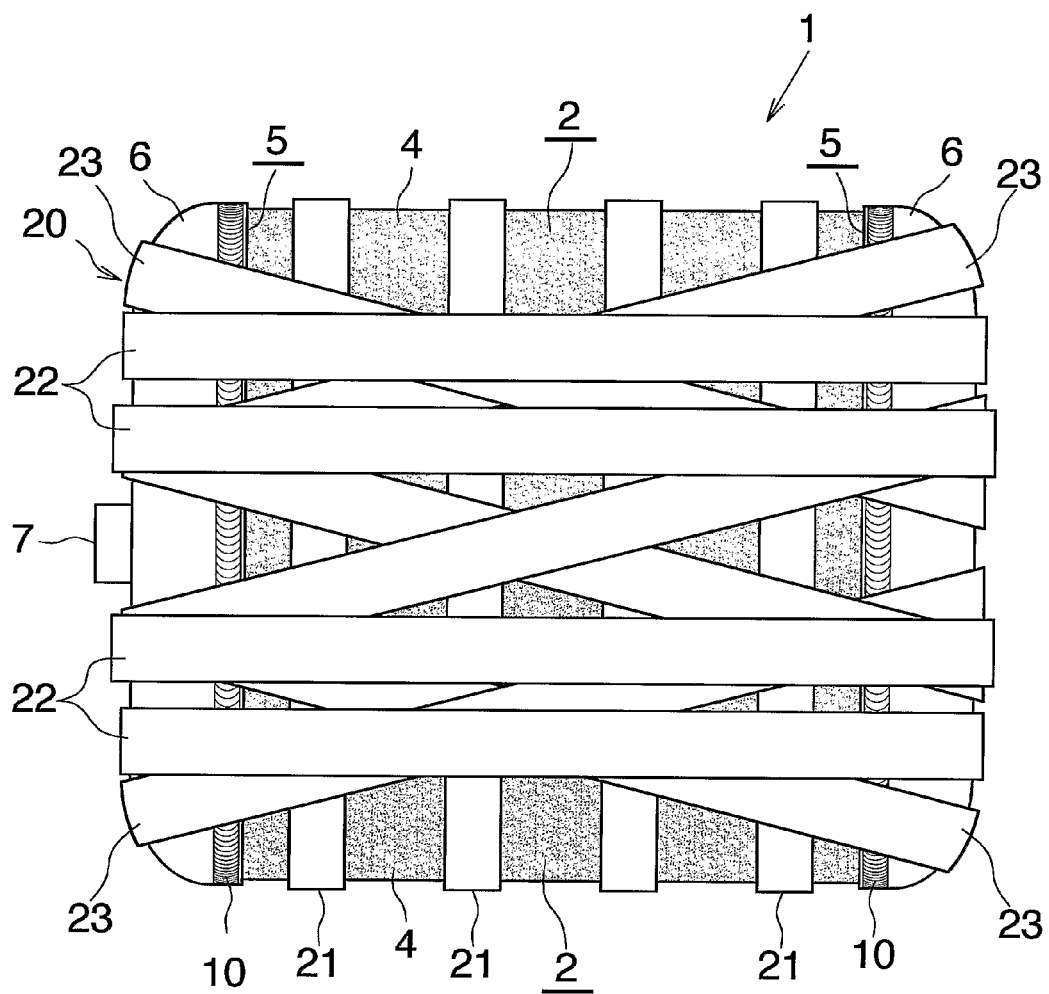
FIG. 7 is a plan view showing an example of measures for the case when a higher pressure resistance is required of the pressure vessel according to embodiment 1.

This embodiment is shown in FIGS. 1 to 7. FIGS. 1 to 3 show a pressure vessel. FIGS. 4 to 6 show the method of fabricating the pressure vessel. In addition, FIG. 7 shows an example of measures for the case when a higher pressure resistance is required.

In FIGS. 1 to 3, the pressure vessel (1) comprises: a plurality of vessel structures (2) each composed of a cylindrical liner (3) made of aluminum, having openings at both ends and lying with its axis in a lateral direction, and a fiber reinforced resin layer (4) covering an outer periphery of a peripheral wall of the liner (3), the vessel structures (2) being arranged in parallel in a front-to-back direction with the axes of the liners (3) on an identical horizontal plane; end plates (5) made of aluminum, formed stationarily across both right and left ends of the liners (3) of all the vessel structures (2); and outward-bulging dome-shaped communicating members (6) made of aluminum, fixed to the respective end plates (5), the communicating members (6) making the interiors of the liners (3) of all the vessel structures (2) communicate with each other and closing the openings at both ends of all the liners (3). The liners (3) of all the vessel structures (2) form a single closed space, and a single mouth portion (7) for making the closed space communicate with exterior is formed on one of the communicating members (6).

The liners (3) of all the vessel structures (2) have the same length, outer diameter, and thickness, and are arranged so that both ends thereof fall on the same vertical planes, respectively. External flanges (8A) and (8B) are integrally formed on both ends of the respective liners (3). The external flanges (8A) of the liners (3) lying at both front and back ends are generally half oval in shape, having an external rim of arc shape. The external flanges (8B) of the other liner (3) are square in shape. The external flanges (8A) and (8B) of all the liners (3) have the same height. The fiber reinforced resin layers (4) are formed by impregnating hooped fiber layers wound at near right angles to the axial direction of the liners (3) with a resin and curing the same. They cover the entire outer peripheries of the peripheral walls of the respective liners (3) excluding the areas of the external flanges (8A) and (8B). Examples of available fibers include carbon fiber, glass fiber, and aramid fiber. Carbon fiber is preferably used. Examples of available resin include an epoxy resin. Then, the external flanges (8A) and (8B) of adjoining liners (3) are joined to each other from outside in the axial direction of the liners (3) by using an appropriate method, or friction agitation joining method here, so that all the vessel structures (2) are integrated. The end plates (5) lying across both ends of the liners (3) are stationarily formed by all the external flanges (8A) and (8B). The joint beads between the external flanges (8A) and (8B) are designated by (9). Incidentally, the method for joining the external flanges (8A) and (8B) to each other is not limited to the friction agitation joining method.

The dome-shaped communicating members (6) are made of forging, die casting, or cutting, and have the same external shape and size as those of the end plates (5). The mouth portion (7) formed on one of the communicating members (6) has a through hole (7a) made from the outer end. A female thread (7b) to be used to mount a control valve, for example, is formed in the inner periphery of the through hole (7a). The communicating members (6) are joined to the end plates (5) by using an appropriate method, or friction agitation joining method here, from around with the ends of their peripheral walls in close contact with the peripheries of one sides of the end plates (5). The joint beads between the communicating members (6) and the end plates (5) are designated by (10). Incidentally, the method for joining the communicating members (6) and the end plates (5) is not limited to the friction agitation joining method.

Each of the liners (3) and the two communicating members (6) is made of, for example, any one of JIS A2000 alloy, JIS A5000 alloy, JIS A6000 alloy, and JIS A7000 alloy. All the liners (3) and the two communicating members (6) may be made of the same material, or at least one of them may be made of a different material.

As shown in FIGS. 4 to 6, the pressure vessel (1) is fabricated by the following methods.

Initially, the vessel structures (2) are fabricated by the methods shown in FIGS. 4 and 5. Incidentally, FIG. 4 shows the method for fabricating a vessel structure (2) to be located at one end in the front-to-back direction. FIG. 5 shows the method for fabricating a vessel structure (2) to be located at the center in the front-to-back direction.

More specifically, a hollow extruded article of aluminum (15A) or (15B) which has the same external shape and size in cross section as those of the external flanges (8A) or (8B) and has a through hole (16) of circular cross section is formed (see FIGS. 4(a) and 5(a)). Next, turning is applied to the outer periphery of the hollow extruded article (15A) or (15B) excluding both ends thereof. The cylindrical liner (3) opened at both ends and the external flanges (8A) or (8B) on both ends of the liner (3) are thus formed simultaneously (see FIGS. 4(b) and 5(b)). Next, a hooped fiber layer is formed on the outer periphery of the liner (3) by winding a resin-impregnated reinforcing fiber or a bundle of resin-impregnated reinforcing fibers in a direction near perpendicular to the axis of the liner (3) by a filament winding method. Thereafter, the resin is cured to form the fiber reinforced resin layer (4), whereby the vessel structure (2) is fabricated (see FIGS. 4(c) and 5(c)).

Besides, the two dome-shaped communicating members (6) are fabricated by forging, die casting, or cutting. The mouth portion (7) is formed on one of the communicating members (6).

Next, all the vessel structures (2) are arranged in parallel so that the axes thereof fall on an identical horizontal plane and both ends thereof fall on the same vertical planes. The side edges of the external flanges (8A) and (8B) of adjoining vessel structures (2) are put into contact with each other. Then, the external flanges (8A) and (8B) of the adjoining vessel structures (2) are joined to each other by friction agitation from outside in the axial direction of the liners (3), whereby the end plates (5) are formed stationarily (see FIG. 6). Subsequently, with the ends of the peripheral walls of the two communicating members (6) in contact with the rims of the external surfaces of the two end plates (5), the communicating members (6) and the end plates (5) are joined from around by friction agitation.

The pressure vessel (1) is fabricated thus.

In embodiment 1, the liners (3) and the external flanges (8A) and (8B) are integrally formed by the application of cutting to the hollow extruded articles (15A) and (15B). Instead, the liners (3) and the external flanges (8A) and (8B) may be integrally formed by die casting.

Moreover, in embodiment 1, the liners (3) are made of aluminum. Instead, ones made of resin may be used. When the liners (3) made of resin are used, the external flanges (8A) and (8B) are sometimes integrally formed of resin. In this case, the external flanges (8A) and (8B) are joined to each other to form the end plates (5) by welding or adhesive bonding. Communicating members (6) made of resin are also employed, and joined to the end plates (5) by welding or adhesive bonding. Even when the liners (3) made of resin are used, external flanges (8A) and (8B) made of aluminum, separate from the liners (3), are sometimes used. In this case, the liners (3) and the external flanges (8A) and (8B) are integrated, for example, by injection molding the liners (3) with the external flanges (8A) and (8B) as inserts. Incidentally, in this case, the external flanges (8A) and (8B) are jointed to each other, and the communicating members (6) and the end plates (5) are joined to each other, in the same manner as in embodiment 1.

If a higher pressure resistance is required of the pressure vessel (1), a secondary fiber reinforced resin layer (20) is formed across all the vessel structures (2) as shown in FIG. 7.

The secondary fiber reinforced resin layer (20) comprises: a hooped fiber reinforced resin layer (21) formed by impregnating a hooped fiber layer, or a reinforcing fiber wound at near right angles to the axial direction of the liners (3) so as to connect all the vessel structures (2), with a resin and curing the same; an in-plane winding fiber reinforced resin layer (22) formed by impregnating an in-plane winding fiber layer, or a reinforcing fiber wound in parallel with the axial direction of the liners (3), with a resin and curing the same; and a helical winding fiber reinforced resin layer (23) formed by impregnating a helical winding fiber layer, or a reinforcing fiber wound obliquely to the axial direction of the liners (3), with a resin and curing the same. Examples of the fibers for forming the fiber reinforced resin layers (21), (22), and (23) include carbon fiber, glass fiber, and aramid fiber. Carbon fiber is preferably used. Examples of the resins for forming the fiber reinforced resin layers (21), (22), and (23) include an epoxy resin. The fiber reinforced resin layers (21), (22), and (23) are formed by winding resin-impregnated reinforcing fibers or winding bundles of resin-impregnated reinforcing fibers by the filament winding method, and then curing the resin.

Figure 8:
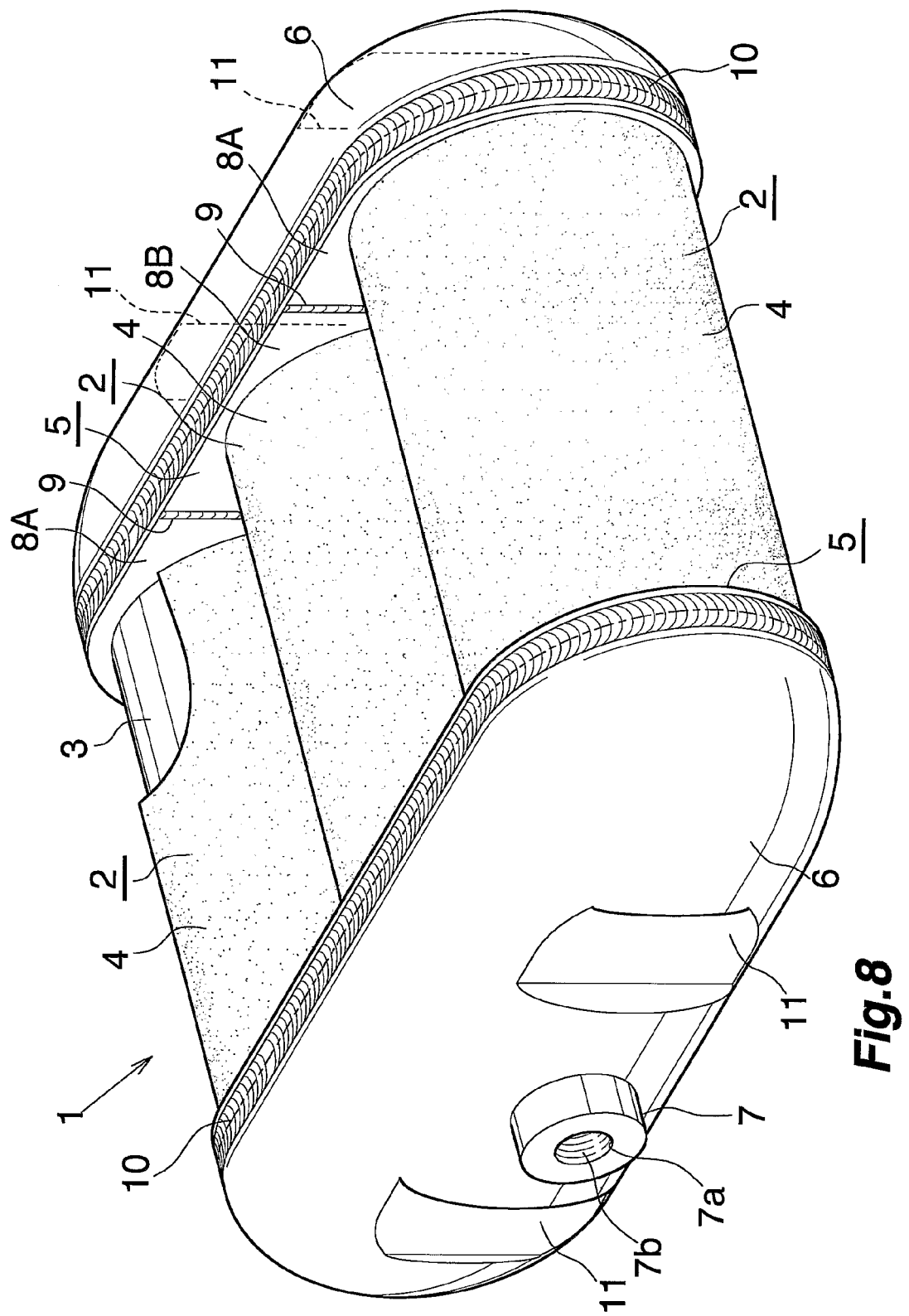
FIG. 8 is a perspective view showing another example of measures for the case when a higher pressure resistance is required of the pressure vessel according to embodiment 1, a secondary fiber reinforced resin layer being omitted.
Figure 9:
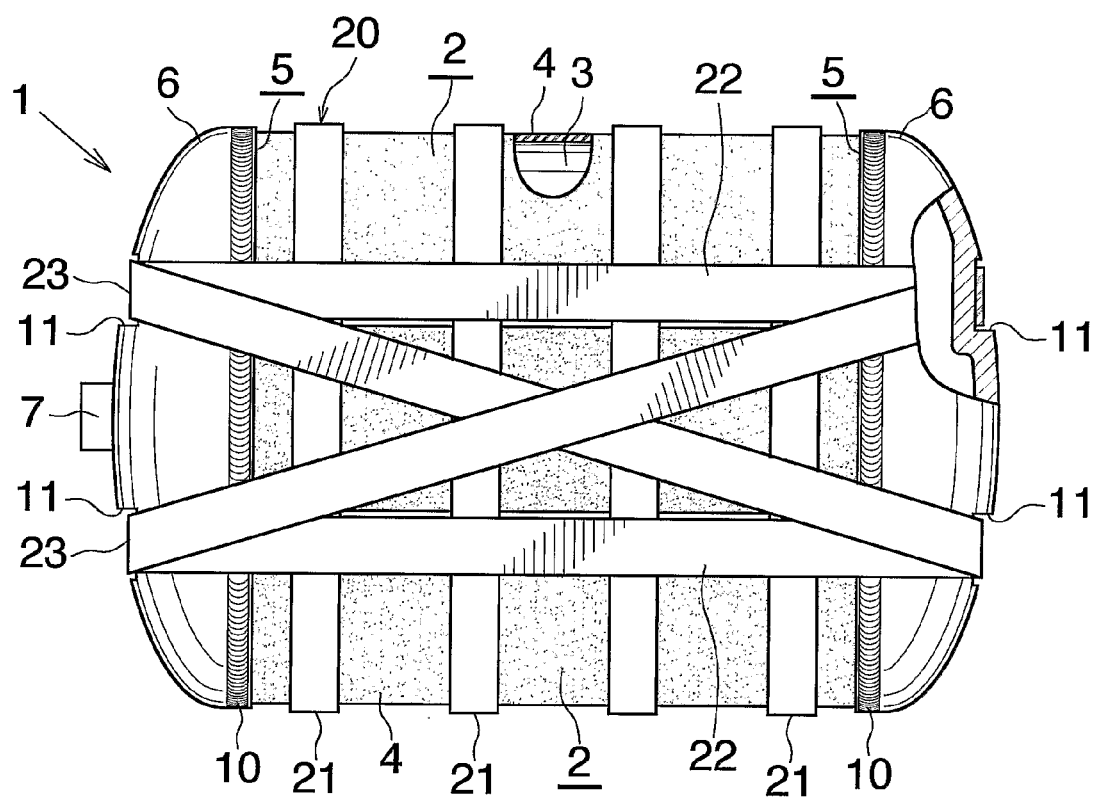
FIG. 9 is a partly-broken plan view of the pressure vessel shown in FIG. 8, provided with the secondary fiber reinforced resin layer.

Moreover, the secondary fiber reinforced resin layer (20) intended to enhance the pressure resistance is sometimes formed as shown in FIGS. 8 and 9.

More specifically, as shown in FIG. 8, a plurality, or two here, of vertically-extending recesses (11) serving as anti-slip means are formed in the top of the external surface of each dome-shaped communicating member (6) of the pressure vessel (1) with an interval in the front-to-back direction. The recesses (11) in one of the communicating members (6) and the recesses (11) in the other communicating member (6) are located at the same positions in terms of the front-to-back direction. Then, as shown in FIG. 9, the in-plane winding fiber layer for forming the in-plane winding fiber reinforced resin layer (22) is formed by winding resin-impregnated reinforcing fibers or bundles of resin-impregnated reinforcing fibers so that they are fitted into the recesses (11) lying in the same positions of the two communicating members (6) in terms of the front-to-back direction. Moreover, the helical winding fiber layer for forming the helical winding fiber reinforced resin layer (23) is formed by winding resin-impregnated reinforcing fibers or bundles of resin-impregnated reinforcing fibers so that they are fitted into the recesses (11) lying in the different positions of the two communicating members (6) in terms of the front-to-back direction. Incidentally, the mouth portion (7) on one of the communicating members (6) is formed between the two recesses (11).

Embodiment 2

Figure 10:
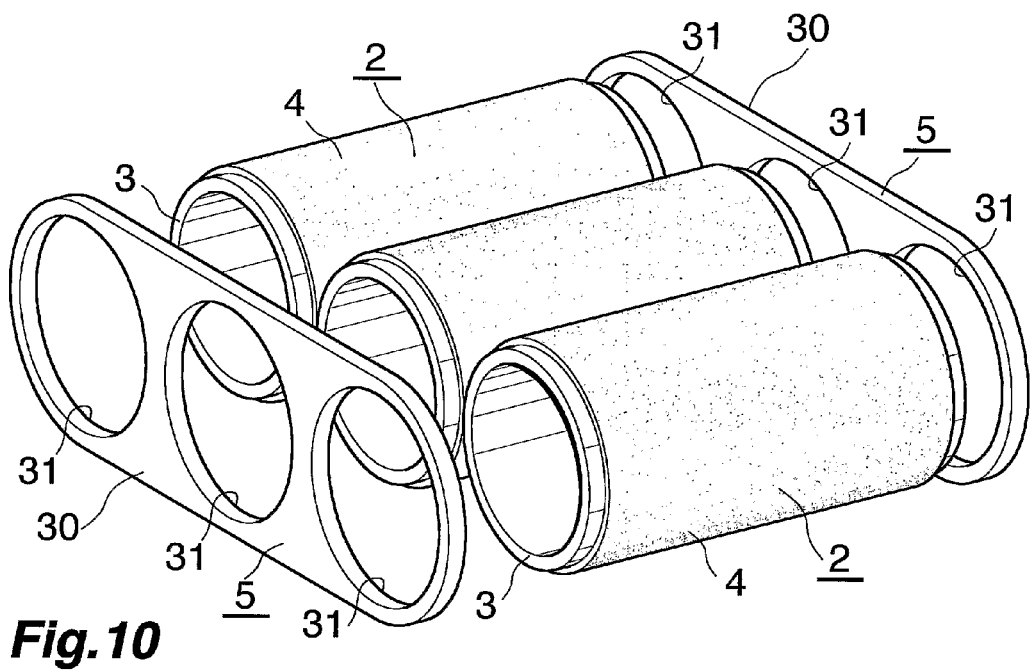
FIG. 10 is an exploded perspective view showing the pressure vessel according to embodiment 2 of this invention, the communicating members being omitted.

This embodiment is shown in FIG. 10.

With the pressure vessel of this embodiment, the end plates (5) are each made of a single metal plate, or aluminum plate (30) here, having through holes (31) for the open ends of the liners (3) to be fitted into. Then, both ends of the individual liners (3) are fitted into the through holes (31) in the respective aluminum plates (30). The areas of the aluminum plates (30) around the through holes (31) and the open ends of the liner (3) are joined from outside in the axial direction of the liners (3) by an appropriate method such as the friction agitation joining method. Incidentally, no fiber reinforced resin layer (4) is formed on both ends of the liners (3) where to be fitted into the through holes (31) in the aluminum plates (30). The method for joining the aluminum plates (30) and the liners (3) is not limited to the friction agitation joining method.

The aluminum plates (30) are made of, for example, any one of JIS A2000 alloy, JIS A5000 alloy, JIS A6000 alloy, and JIS A7000 alloy.

The rest of the configuration is the same as that of the pressure vessel (1) according to embodiment 1. If a higher pressure resistance is required, the secondary fiber reinforced resin layer (20) is formed across all the vessel structures (2) as in embodiment 1.

Embodiment 3

Figure 11:
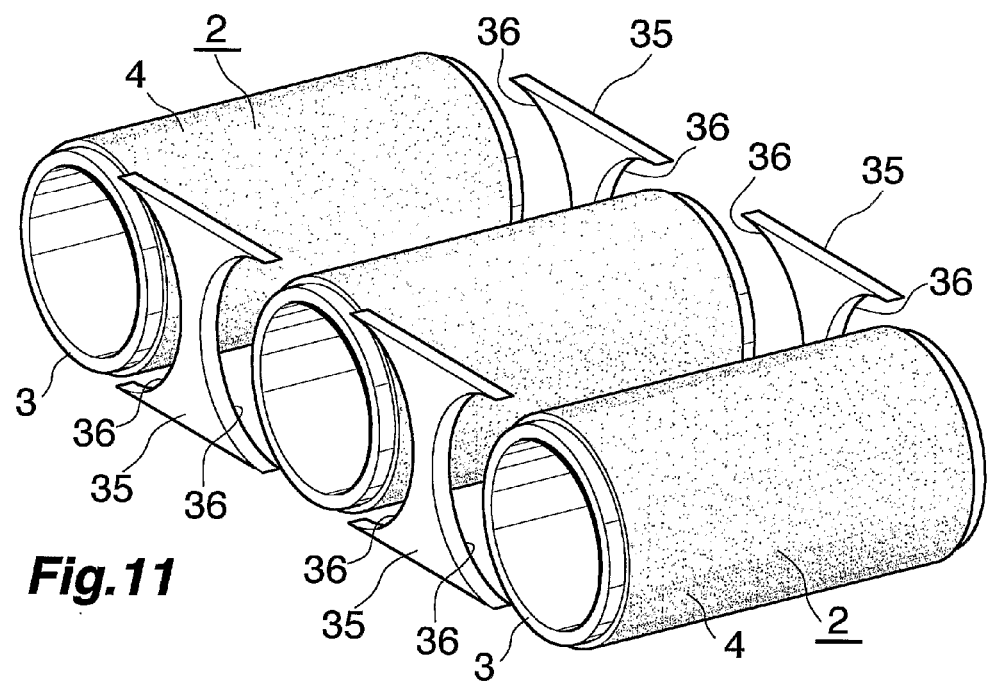
FIG. 11 is an exploded perspective view showing the pressure vessel according to embodiment 3 of this invention, the communicating members being omitted.

This embodiment is shown in FIG. 11.

The pressure vessel of this embodiment does not use the end plates (5). Both ends of the liners (3) of adjoining vessel structures (2) are connected and integrated with each other by the intervention of plate-like connecting members (35) made of metal, or made of aluminum here. More specifically, semi-circular notches (36) for halves of the ends of two adjoining liners (3) to be fitted to are formed in both sides of the connecting members (35) Then, the halves of both ends of the liners (3) are fitted into the notches (36) in the connecting members (35). The areas of the connecting members (35) around the notches (36) and both ends of the liner (3) are joined from outside in the axial direction of the liners (3) by an appropriate method such as the friction agitation joining method. Incidentally, no fiber reinforced resin layer (4) is formed on both ends of the liners (3) where to be fitted into the notches (36) in the connecting members (35). The method for joining the connecting members (35) and the liners (3) is not limited to the friction agitation joining method.

The dome-shaped communicating members (6) have the same external shape and size as those of the assemblies of all the liners (3) and the connecting members (35). The communicating members (6) are joined with the ends of the peripheral walls in contact with the rims of the ends of the assemblies of all the liners (3) and the connecting members (35), from around by an appropriate method such as the friction agitation joining method. The method for joining the communicating members (6), the liners (3), and the connecting members (35) is not limited to the friction agitation joining method.

The connecting members (35) are made of, for example, any one of JIS A2000 alloy, JIS A5000 alloy, JIS A6000 alloy, and JIS A7000 alloy.

The rest of the configuration is the same as that of the pressure vessel (1) according to embodiment 1. If a higher pressure resistance is required, the secondary fiber reinforced resin layer (20) is formed across all the vessel structures (2) as in embodiment 1.

Embodiment 4

Figure 12:
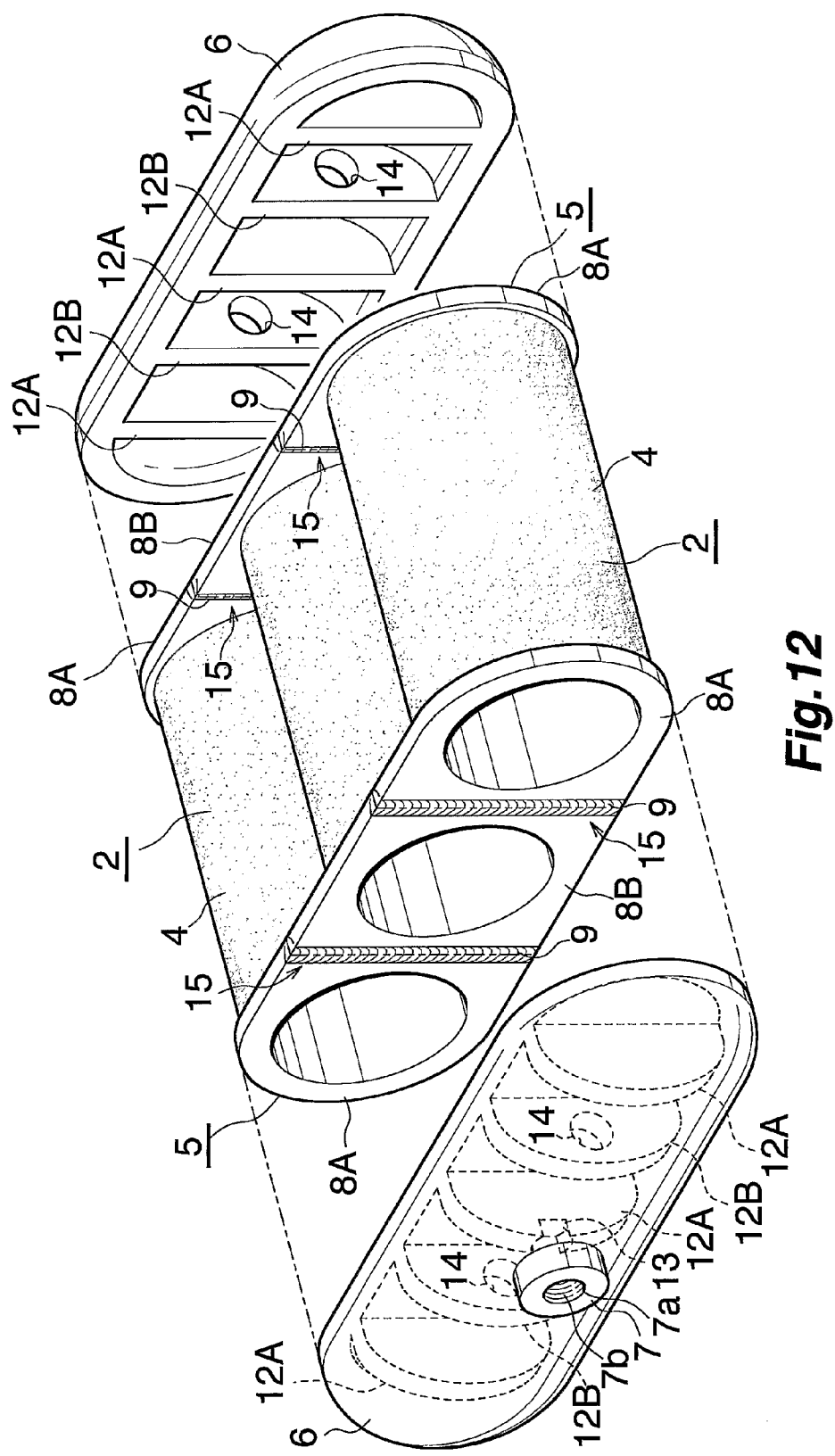
FIG. 12 is an exploded perspective view showing the pressure vessel according to embodiment 4 of this invention.

This embodiment is shown in FIG. 12.

In the pressure vessel of this embodiment, a plurality of reinforcing walls (12A) and (12B) extending in the vertical direction are arranged stationarily in each of the dome-shaped communicating members (6) so that they are integrally formed on areas corresponding to the centers of all the liners (3) in the front-to-back direction (the reinforcing walls (12A)) and on areas corresponding to connecting parts (15) of the endplates (5) where the ends of adjoining liners (3) are connected to each other (the reinforcing walls (12B)). Incidentally, instead of being integrally formed on the communicating members (6), the reinforcing walls (12A) and (12B) may be formed separately and attached stationarily.

In the communicating member (6) having the mouth portion (7), the lateral outer end of the reinforcing wall (12A) that is integrally formed on the area corresponding to the center, in terms of the front-to-rear direction, of the center liner (3) is provided with a notch (13). The notch (13) makes the interior of the closed space of the pressure vessel (1) communicate with exterior via the through hole (7a) in the mouth portion (7). The reinforcing walls (12B) integrally formed on the communicating members (6) at the areas corresponding to the connecting parts (15) of the end plates (5) have a through hole (14) in the front-to-back direction each. The interiors of the adjoining liners (3) are thus put in communication with each other via these through holes (14). Incidentally, instead of the through holes (14), the reinforcing walls (12B) may be notched from their lateral inner ends so that the interiors of the adjoining liners (3) communicate with each other via these notches.

The reinforcing walls (12B) integrally formed on the communicating members (6) at the areas corresponding to the connecting parts (15) of the end plates (5) are connected by being metallurgically joined or adhesive bonded to the connecting parts (15) of the end plates (5). The metallurgical joint between the reinforcing walls (12B) and the connecting parts

(15) is effected by forging, pressure welding, resistance welding, brazing, or the like. Incidentally, the reinforcing walls (12B) need not necessarily be connected to the connecting parts (15).

The rest of the configuration is the same as that of the pressure vessel (1) according to embodiment 1. If a higher pressure resistance is required, the secondary fiber reinforced resin layer (20) is formed across all the vessel structures (2) as in embodiment 1.

Embodiment 5

Figure 13:
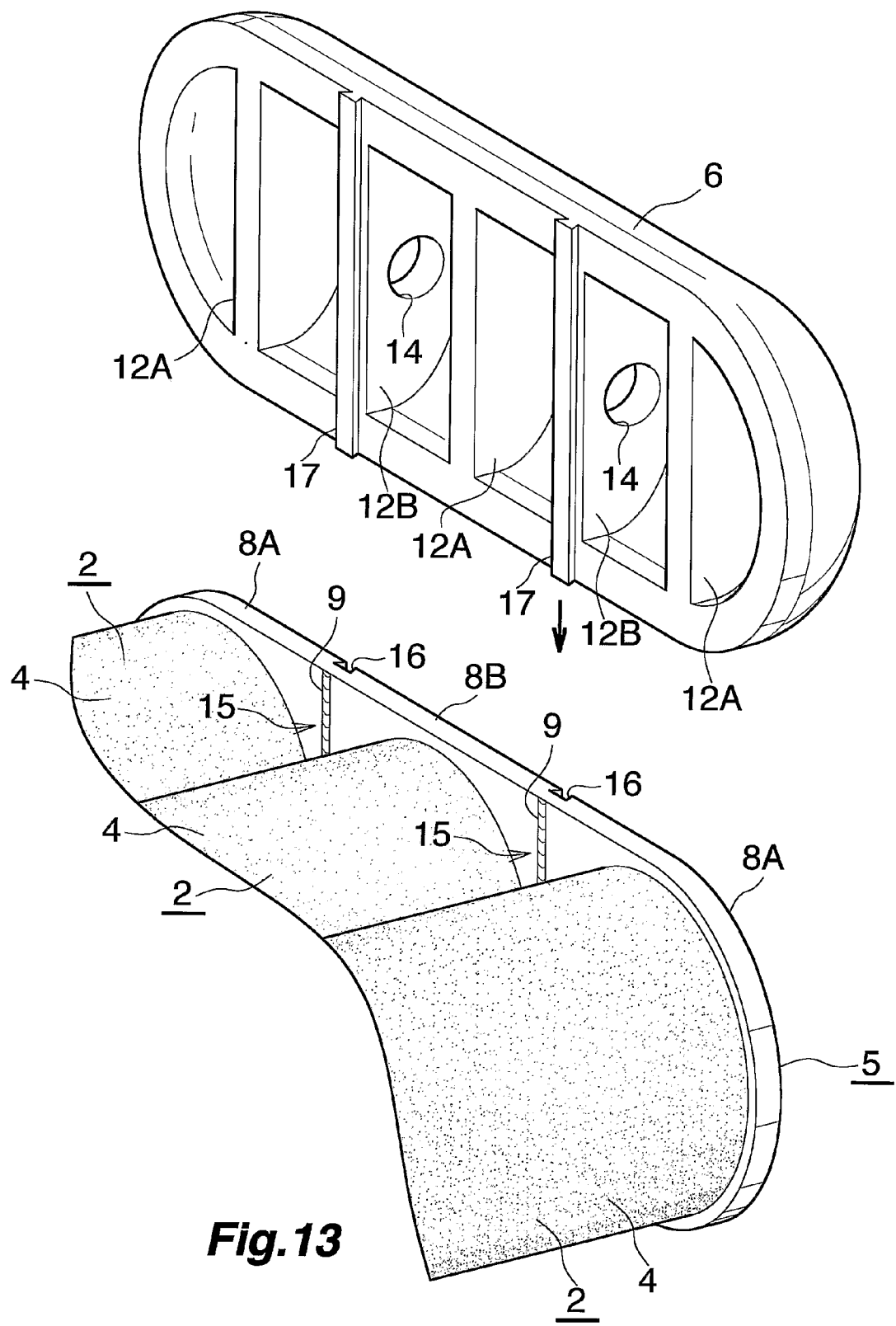
FIG. 13 is an exploded perspective view showing part of the pressure vessel according to embodiment 5 of this invention.
Figure 14:
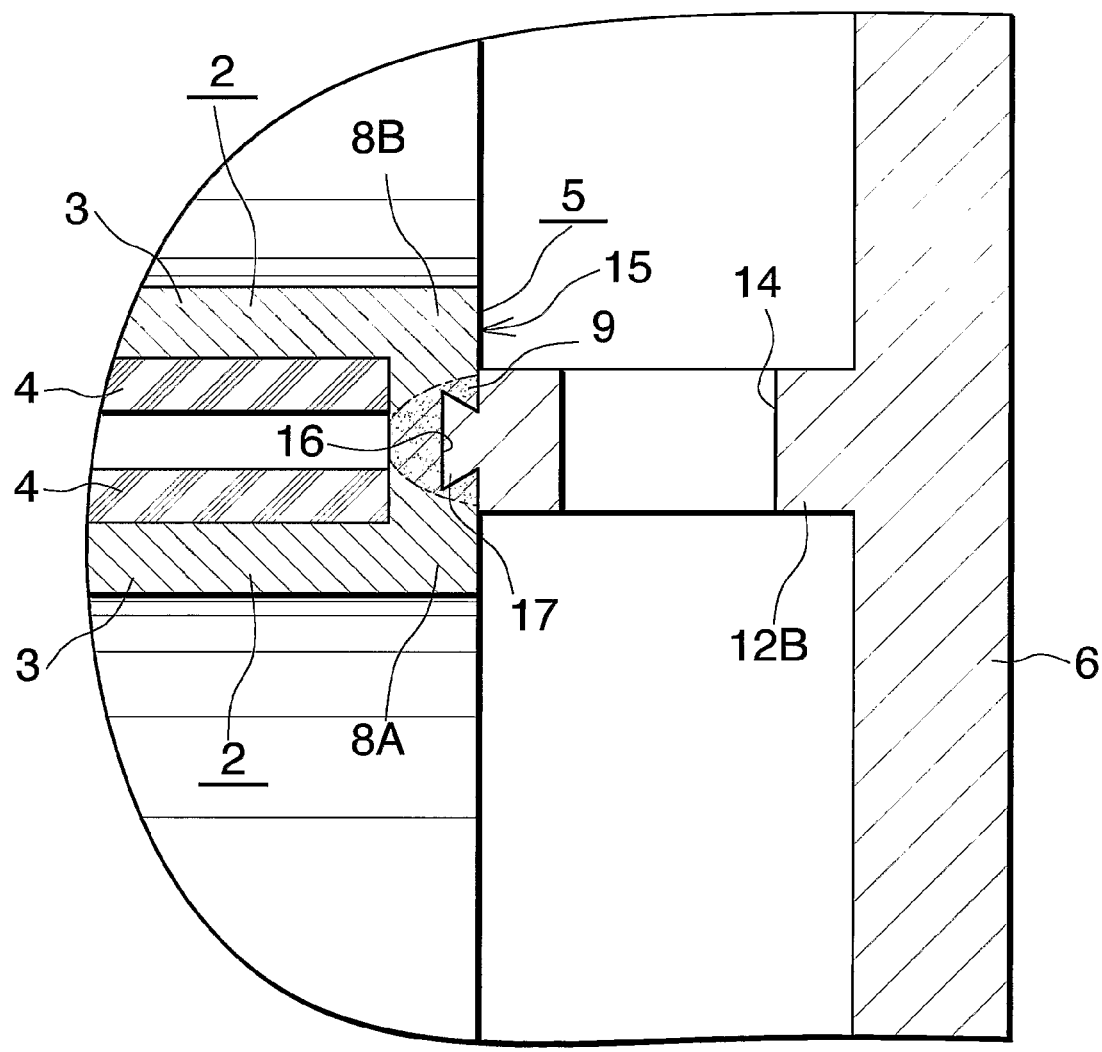
FIG. 14 is an enlarged horizontal sectional view showing part of the pressure vessel according to embodiment 5 of this invention.

This embodiment is shown in FIGS. 13 and 14.

In the pressure vessel of this embodiment, the lateral outer surfaces of the respective connecting parts (15) of the end plates (5) are provided with inside spreading grooves (16) which extend in the vertical direction. Both top and bottom ends of the inside spreading grooves (16) open to both top and bottom sides of the end plates (5). Moreover, the reinforcing walls (12B) of the communicating members (6) are provided with fitting portions (17). The fitting portions (17) extend in the vertical direction, and are intended to be fitted into the inside spreading grooves (16) in the end plates (5). The fitting portions (17) extend up to the outer peripheries of the peripheral walls of the communicating members (6). Then, the fitting portions (17) are fitted into the inside spreading grooves (16) from the openings in one of the top and bottom sides, whereby the reinforcing walls (12B) of the communicating members (6) are connected to the connecting parts (15) of the end plates (5).

The rest of the configuration is the same as that of the pressure vessel (1) according to embodiment 4. If a higher pressure resistance is required, the secondary fiber reinforced resin layer (20) is formed across all the vessel structures (2) as in embodiment 1.

In the foregoing embodiments 2 to 5, liners (3) made of resin may also be used. When the liners (3) made of resin are used, all the liners (3) and the end plates (5), or all the liners (3) and the connecting members (35), are sometimes integrally formed of resin. In this case, the communicating members (6) are also made of resin, and joined to the end plates (5), or the connecting members (35) and the liners (3), by welding or adhesive bonding. Incidentally, in embodiment 4, if the communicating members (6) are made of resin, the reinforcing walls (12A) and (12B) are also made of resin and are joined to the end plates (5) by welding or adhesive bonding. Moreover, even when the liners (3) made of resin are used, the end plates (5) or connecting members (35) made of aluminum, separate from the liners (3), are sometimes used. In this case, the liners (3) are integrated with the end plates (5) or the connecting members (35), for example, by injection molding all the liners (3) at the same time with the end plates (5) or the connecting members (35) as inserts.

In the foregoing embodiments 1 to 5, the number of vessel structures (2) may be changed as appropriate. Incidentally, if the number of vessel structures (2) is rendered two in embodiments 1, 2, 4, and 5, the two vessel structures (2) are located at both ends in the front-to-back direction in FIG. 1. Moreover, in the foregoing embodiments 1 to 5, the liners (3) of all the vessel structures (2) are given the same outer diameter. This is not restrictive, however, and the liner (3) of at least one of the vessel structures (2) may have a different outer diameter. In this case, the shapes of the end plates (5) in embodiments 1, 2, 4, and 5, and the shapes of the connecting members (35) in embodiment 3 are changed as appropriate.

Figure 15:
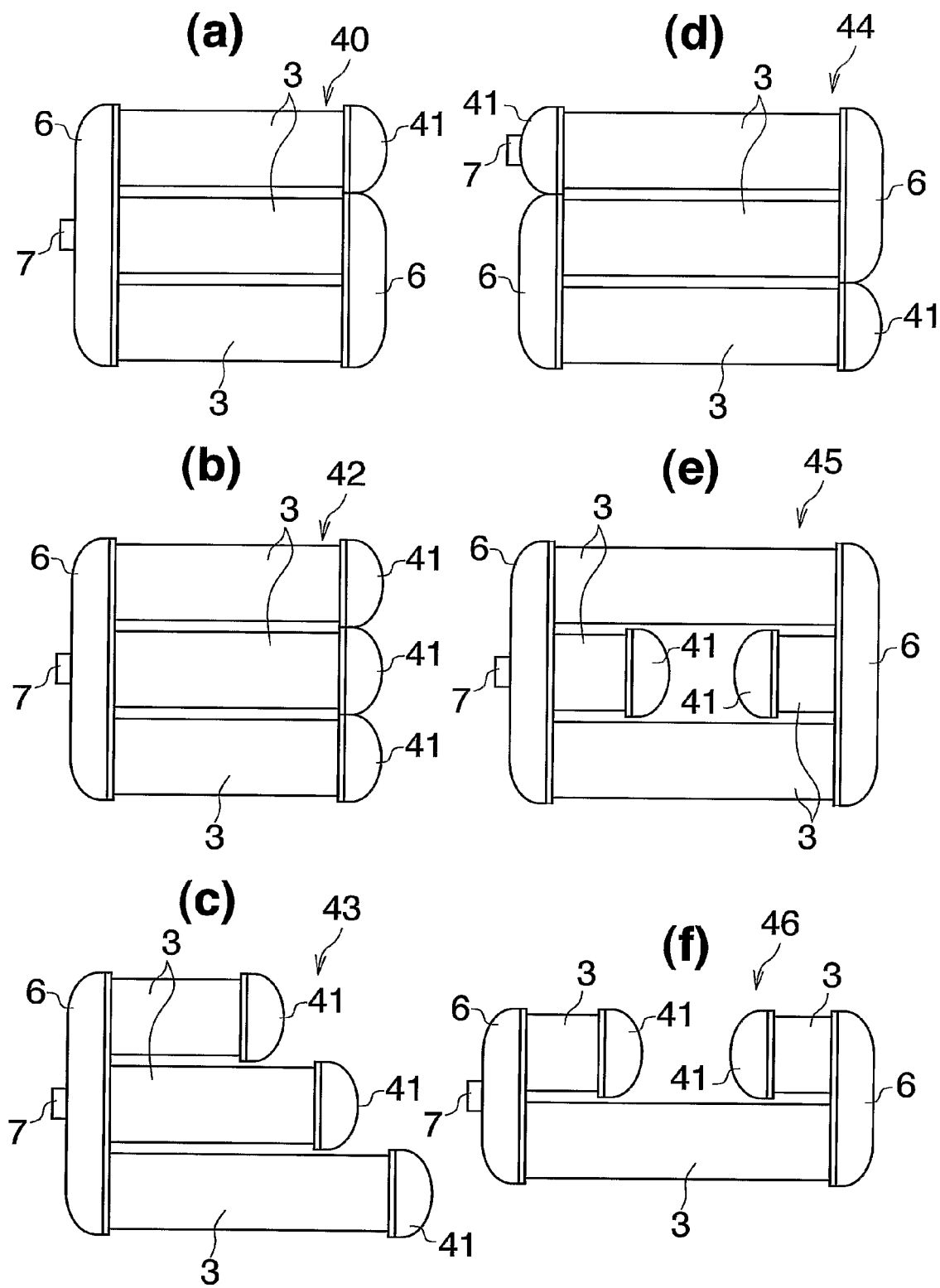
FIG. 15 is a partly-omitted plan view showing modifications of the pressure vessel for situations where vessel structures having liners of the same diameter are arranged so that the axes of the liners fall on an identical horizontal plane.

FIG. 15 shows modifications of the pressure vessel for cases where a plurality of vessel structures (2) having liners (3) of the same outer diameter and the same thickness are arranged in the front-to-back direction so that their axes fall on an identical horizontal plane. Incidentally, the fiber reinforced resin layers are omitted from FIG. 15.

In the pressure vessel (40) shown in FIG. 15(a), all the liners (3) have the same length and all the liners (3) are arranged so that both ends thereof fall on the same vertical planes. Then, the left ends of all the liners (3) are connected and integrated with each other by using an end plate (5) of embodiments 1, 2, 4, and 5, or connecting members (35) of embodiment 3. Through the use of the end plate (5) or the connecting members (35), the dome-shaped communicating member (6) having the mouth portion (7) is joined across the left ends of all the liners (3). This makes the interiors of all the liners (3) communicate with each other, and closes the openings in the left ends of all the liners (3).

The right ends of the two adjoining front liners (3) are connected and integrated with each other by using an end plate (5) of embodiments 1, 2, 4, and 5, or a connecting member (35) of embodiment 3. Through the use of the end plate (5) or the connecting member (35), the dome-shaped communicating member (6) is joined across the right ends of the two liners (3). This makes the interiors of both the liners (3) communicate with each other, and closes the openings in the right ends of both the liners (3). A closing member (41) of generally hemispherical hollow shape is joined to the right end of the rear liner (3) from around by an appropriate method such as the friction agitation joining method. The opening in the right end of each liner (3) is closed by the closing member (41). Incidentally, this liner (3) and the closing member (41) may be integrally formed by forging.

Besides, the mouth portion (7) may be formed on the right communicating member (6) or the closing member (41), instead of the left communicating member (6).

In the pressure vessel (42) shown in FIG. 15(b), all the liners (3) have the same length and all the liners (3) are arranged so that both ends thereof fall on the same vertical planes. Then, the left ends of all the liners (3) are connected and integrated with each other by using an end plate (5) of embodiments 1, 2, 4, and 5, or connecting members (35) of embodiment 3. Through the use of the end plate (5) or the connecting members (35), the dome-shaped communicating member (6) having the mouth portion (7) is joined across the left ends of all the liners (3). This makes the interiors of all the liners (3) communicate with each other, and closes the openings in the left ends of all the liners (3).

Closing members (41) are joined to the right ends of the respective liners (3) from around by an appropriate method such as the friction agitation joining method. The openings in the right ends of the liners (3) are closed by the respective closing members (41). Incidentally, the liners (3) and the respective closing members (41) may be integrally formed by forging.

Besides, the mouth portion (7) may be formed on any one of the closing members (41), instead of the communicating member (6).

In the pressure vessel (43) shown in FIG. 15(c), all the liners (3) have different lengths. All the liners (3) are arranged so that their left ends fall on the same vertical plane. Then, the left ends of all the liners (3) are connected and integrated with each other by using an end plate (5) of embodiments 1, 2, 4, and 5, or connecting members (35) of embodiment 3. Through the use of the end plate (5) or the connecting members (35), the dome-shaped communicating member (6) having the mouth portion (7) is joined across the left ends of all the liners (3). This makes the interiors of all the liners (3) communicate with each other, and closes the openings in the left ends of all the liners (3).

Closing members (41) are joined to the right ends of the respective liners (3) from around by an appropriate method such as the friction agitation joining method. The openings in the right ends of the liners (3) are closed by the respective closing members (41). Incidentally, the liners (3) and the respective closing members (41) may be integrally formed by forging.

Besides, the mouth portion (7) may be formed on any one of the closing members (41), instead of the communicating member (6).

In the pressure vessel (44) shown in FIG. 15(*d*), all the liners (3) have the same length and all the liners (3) are arranged so that both ends thereof fall on the same vertical planes. The left ends of the two front liners (3), and the right ends of the two rear liners (3), are connected and integrated with each other by using end plates (5) of embodiments 1, 2, 4, and 5, or connecting members (35) of embodiment 3. Through the use of the end plates (5) or the connecting members (35), dome-shaped communicating members (6) are joined each across the ends of the two adjoining liners (3). This makes the interiors of these liners (3) communicate with each other, and closes the openings in the left ends of the two adjoining front liners (3) and the openings in the right ends of the two adjoining rear liners (3).

In addition, closing members (41) are jointed to the right end of the front liner (3) and the left end of the rear liner (3), respectively, from around by an appropriate method such as the friction agitation joining method. The openings in the ends of the liners (3) opposite from the communicating members (6) are closed by the closing members (41). Incidentally, these liners (3) and the closing members (41) may be integrally formed by forging. Then, the mouth portion (7) is formed on the closing member (41) of the rear liner (3).

Otherwise, the mouth portion (7) may be formed on the closing member (41) of the front liner (3) or either one of the communicating members (6), instead of the closing member (41) of the rear liner (3).

In the pressure vessel (45) shown in FIG. 15(*e*), two liners (3) having the same length are spaced in the front-to-back direction so that both ends thereof fall on the same vertical planes. Between the two liners (3), two short liners (3) are arranged so as to fall on an identical line extending in the lateral direction. The left end of one of the short liners (3) is located in the same vertical plane as the left ends of the two long liners (3) are. The left ends of these three liners (3) are connected and integrated with each other by using an end plate (5) of embodiments 1, 2, 4, and 5, or connecting members (35) of embodiment 3. Through the use of the end plate (5) or the connecting members (35), the dome-shaped communicating member (6) having the mouth portion (7) is joined across the left ends of all the liners (3). This makes the interiors of the three liners (3) communicate with each other, and closes the openings in the left ends of the three liners (3). The right end of the other short liner (3) is located in the same vertical plane as the right ends of the two long liners (3) are. The right ends of these three liners (3) are connected and integrated with each other by using an end plate (5) of embodiments 1, 2, 4, and 5, or connecting members (35) of embodiment 3. Through the use of the end plate (5) or the connecting members (35), the dome-shaped communicating member (6) is joined across the right ends of all the liners (3). This makes the interiors of the three liners (3) communicate with each other, and closes the openings in the right ends of the three liners (3).

In addition, closing members (41) are joined to the ends of the two short liners (3) opposite from the communicating members (6) by an appropriate method such as the friction agitation joining method. The openings in those ends of the liners (3) are closed by the closing members (41). Incidentally, the short liners (3) and the closing members (41) may be integrally formed by forging.

Besides, the mouth portion (7) may be formed on the right communicating member (6) or either one of the closing members (41), instead of the left communicating member (6).

In the pressure vessel (46) shown in FIG. 15(*f*), two short liners (3) are arranged behind a single liner (3) so as to fall on an identical line extending in the lateral direction. The left end of one of the short liners (3) is located in the same vertical plane as the left end of the long liner (3) is. The left ends of these two liners (3) are connected and integrated with each other by using an end plate (5) of embodiments 1, 2, 4, and 5, or a connecting member (35) of embodiment 3. Through the use of the end plate (5) or the connecting member (35), the dome-shaped communicating member (6) having the mouth portion (7) is joined across the left ends of the two adjoining liners (3). This makes the interiors of the two liners (2) communicate with each other, and closes the openings in the left ends of the two liners (3). The right end of the other short liner (3) is located in the same vertical plane as the right end of the long liner (3) is. The right ends of these two liners (3) are connected and integrated with each other by using an end plate (5) of embodiments 1, 2, 4, and 5, or a connecting member (35) of embodiment 3. Through the use of the end plate (5) or the connecting member (35), the dome-shaped communicating member (6) is joined across the right ends of the two adjoining liners (3). This makes the interiors of the two liners (2) communicate with each other, and closes the openings in the right ends of the two liners (3).

In addition, closing members (41) are joined to the ends of the two short liners (3) opposite from the communicating members (6) by an appropriate method such as the friction agitation joining method. The openings in those ends of the liners (3) are closed by the closing members (41). Incidentally, the short liners (3) and the closing members (41) may be integrally formed by forging.

Besides, the mouth portion (7) may be formed on the right communicating member (6) or either one of the closing members (41), instead of the left communicating member (6). In the pressure vessels (40) and (42) to (46) shown in FIGS. 15(*a*) to 15(*f*), liners (3) made of resin are also sometimes used. In this case, the liners (3) are connected and integrated in the manners as described in embodiments 1 to 5.

Moreover, in the pressure vessels (40) and (42) to (46) shown in FIGS. 15(*a*) to 15(*f*), the method for joining the liners (3) and the closing members (41) is not limited to the friction agitation joining method.

Figure 16:
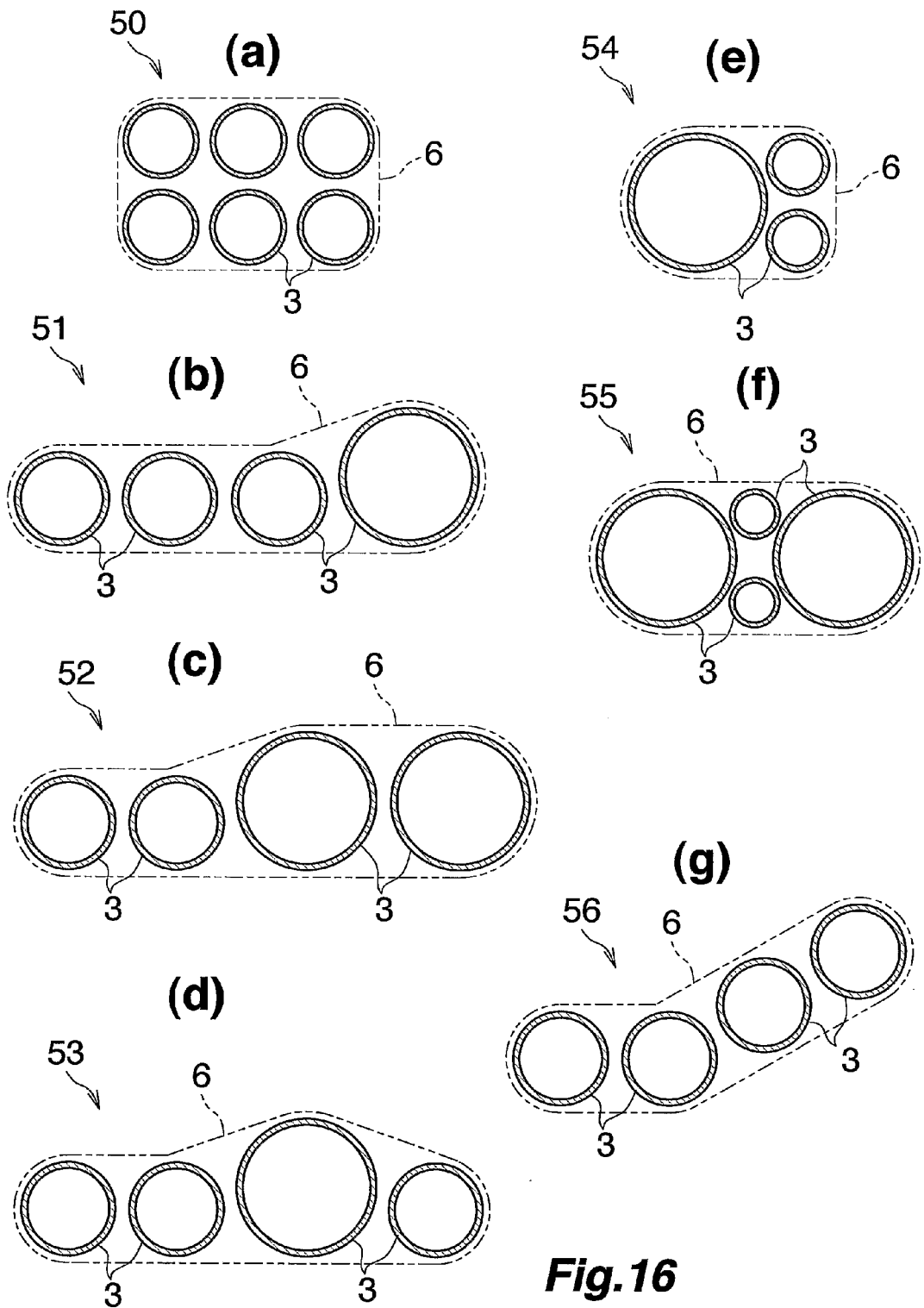
FIG. 16 is a cross-sectional view showing modifications of the pressure vessel for situations where a plurality of vessel structures having liners of the same length are arranged so that the axes of all the liners do not fall on an identical horizontal plane.

FIG. 16 shows modifications of the pressure vessel for cases where a plurality of vessel structures (2) having liners (3) of the same length are arranged so that the axes of all the liners (3) do not fall on an identical horizontal plane. Incidentally, the fiber reinforced resin layers (4) are omitted from FIG. 16.

In the pressure vessel (50) shown in FIG. 16(*a*), a plurality of liners (3) having the same outer diameter and the same thickness are arranged in front and behind, above and below.

In the pressure vessel (51) shown in FIG. 16(*b*), a plurality of liners (3) having the same outer diameter and the same thickness are arranged in the front-to-back direction. A liner (3) having a greater diameter is arranged in front. Incidentally, the number of liners (3) having the smaller diameter may be changed as appropriate.

In the pressure vessel (52) shown in FIG. 16(*c*), a plurality of liners (3) having the same outer diameter and the same thickness are arranged in the front-to-back direction. A plurality of liners (3) having the same greater outer diameter and the same thickness are arranged in front in the front-to-back direction. Incidentally, both the number of liners (3) having the smaller diameter and the number of liners (3) having the greater diameter may be changed as appropriate.

In the pressure vessel (53) shown in FIG. 16(*d*), a plurality of liners (3) having the same smaller outer diameter and the same thickness are arranged in the front-to-back direction behind a single liner (3). In addition, a liner (3) having the same diameter as that of the rear liners (3) is arranged in front. Incidentally, the number of liners (3) having the greater diameter, the number of rear liners (3) having the smaller diameter, and the number of front liners (3) having the smaller diameter each may be changed as appropriate.

In the pressure vessel (54) shown in FIG. 16(*e*), a plurality, or two here, of liners (3) having the same smaller outer diameter and the same thickness are arranged above and below in front of a single liner (3). Incidentally, both the number of liners (3) having the greater diameter and the number of liners (3) having the smaller diameter may be changed as appropriate.

In the pressure vessel (55) shown in FIG. 16(*f*), two liners (3) having the same outer diameter and the same thickness are arranged at an interval in the front-to-back direction. Between the two liners (3), a plurality, or two here, of liners (3) having the same smaller outer diameter and the same thickness are arranged above and below.

In the pressure vessel (56) shown in FIG. 16(*g*), a plurality of liners (3) having the same diameter and the same thickness are horizontally arranged in the front-to-back direction. In front of the foremost liner (3), a plurality of liners (3) having the same diameter as that of these liners (3) are arranged obliquely upward. Incidentally, both the number of liners (3) arranged horizontally and the number of liners (3) arranged obliquely upward in front may be changed as appropriate.

In the pressure vessels (50) to (56) shown in FIGS. 16(*a*) to 16(*g*), both ends of all the liners (3) fall on the same respective vertical planes. The ends of these liners (3) are connected and integrated with each other by using the end plates (5) of embodiments 1, 2, 4, and 5, or the connecting members (35) of embodiment 3. Through the use of the end plates (5) or the connecting members (35), the dome-shaped connecting members (6) are joined across both the ends of all the liners (3). This makes the interiors of all the liners (3) communicate with each other, and closes the openings in both ends of all the liners (3). The mouth portion (7) is formed on either one of the communicating members (6). The communication members (6) have the external shapes as shown by the dashed lines in FIGS. 16(*a*) to 16(*g*). The end plates (5) or the connecting members (35) also have corresponding shapes.

In the pressure vessels (50) to (56) shown in FIGS. 16(*a*) to 16(*g*), liners (3) made of resin are also sometimes used. In this case, the liners (3) are connected and integrated in the manners as described in embodiments 1 to 5.

Moreover, if a higher pressure resistance is required of the pressure vessels (40), (42) to (46), and (50) to (56) shown in FIGS. 15 and 16, secondary fiber reinforced resin layers (20) are sometimes formed across all the vessel structures (2) by an appropriate method as in embodiment 1.

Figure 17:
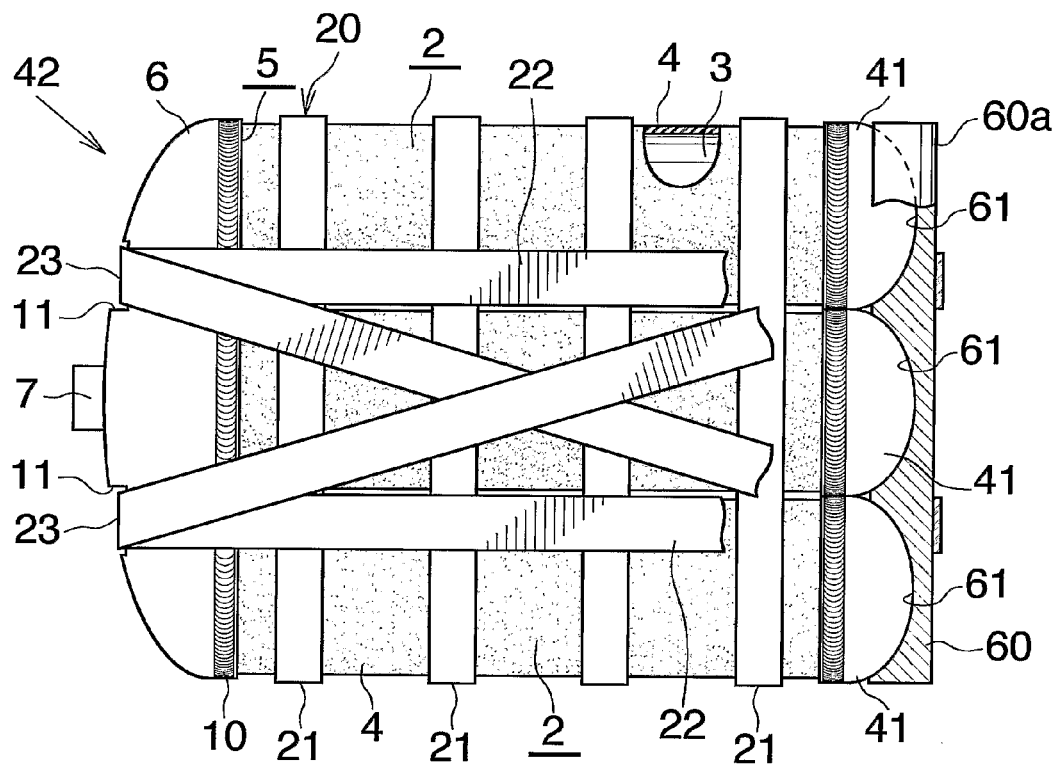
FIG. 17 is a partly-broken plan view showing an example of measures for the case when a higher pressure resistance is required of the pressure vessel shown in FIG. 15(*b*).

For example, FIG. 17 shows the case where a secondary fiber reinforced resin layer (20) is formed on the pressure vessel (42) of FIG. 15(*b*).

As shown in FIG. 17, an anti-slip member (60), or anti-slip means, made of resin or such metal as aluminum is arranged outside the closing members (41) of all the liners (3) so as to lie across these closing members (41). Recesses (61) for all the closing members (41) to be fitted to are formed in the left side of the anti-slip member (60). Moreover, in cross section, the outer part of the anti-slip member (60) in the lateral direction (in the axial direction of the liners) is rounded so that its midsection in terms of the height direction protrudes to the right as viewed from the front. Here, the lateral outer surface of the anti-slip member (60) makes a partial cylindrical surface (60*a*).

The in-plane winding fiber layer for making the in-plane winding fiber reinforced resin layer (22) of the secondary fiber reinforced resin layer (20) which is formed across all the vessel structures (2) is formed by winding resin-impregnated reinforcing fibers or bundles of resin-impregnated reinforcing fibers so that they are fitted into the respective recesses (11) in the communicating member (6) and pass through the positions on the partial cylindrical surface (60*a*) of the anti-slip member (60) corresponding to the respective recesses (11) in terms of the front-to-back direction. The helical winding fiber layer for making the helical winding fiber reinforced resin layer (23) is formed by winding resin-impregnated reinforcing fibers or bundles of resin-impregnated reinforcing fibers so that they are fitted into the respective recesses (11) in the communicating member and pass through the positions on the partial cylindrical surface (60*a*) of the anti-slip member (60) corresponding to different recesses (11) in terms of the front-to-back direction.

Figure 18:
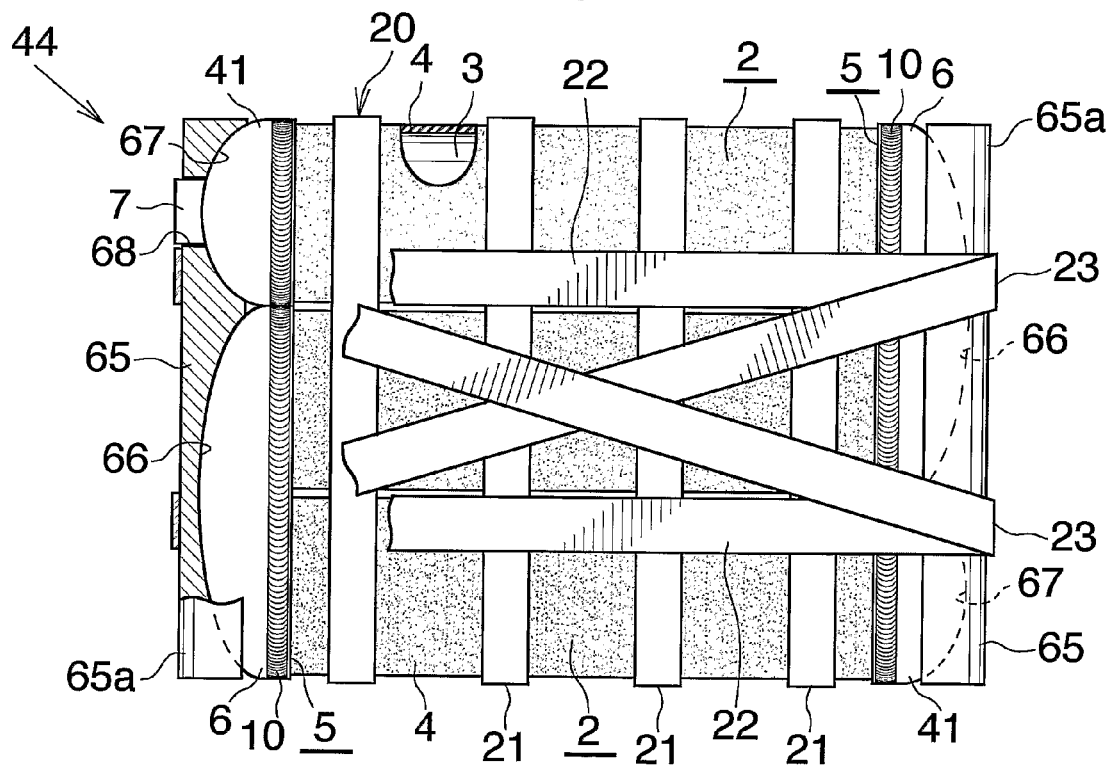
FIG. 18 is a partly-broken plan view showing an example of measures for the case when a higher pressure resistance is required of the pressure vessel shown in FIG. 15(*d*).

Now, FIG. 18 shows the case where a secondary fiber reinforced resin layer (20) is formed on the pressure vessel (44) of FIG. 15(*d*).

As shown in FIG. 18, anti-slip members (65), or anti-slip means, made of resin or such metal as aluminum are arranged outside the communicating members (6) and the closing members (41) on both right and left ends so as to lie across the respective communicating members (6) and the respective closing members (41). Recesses (66) and (67) for the communicating members (6) and the closing members (41) to be fitted to are formed in the lateral inner surfaces of the respective anti-slip members (65). Moreover, in cross section, the outer parts of the respective anti-slip members (65) in the lateral direction (in the axial direction of the liners) are rounded so that their midsections in terms of the height direction protrude laterally outward as viewed from the front. Here, the lateral outer surfaces of the anti-slip members (65) make partial cylindrical surfaces (65*a*). Incidentally, the anti-slip member (65) on the left has a through hole (68) for exposing the mouth portion (7) of the closing member (41) to exterior.

The in-plane winding fiber layer for making the in-plane winding fiber reinforced resin layer (22) of the secondary fiber reinforced resin layer (20) which is formed across all the vessel structures (2) is formed by winding resin-impregnated reinforcing fibers or bundles of resin-impregnated reinforcing fibers so that they pass through the same positions on the partial cylindrical surfaces (65*a*) of both the anti-slip members (65) in terms of the front-to-back direction. The helical winding fiber layer for making the helical winding fiber reinforced resin layer (23) is formed by winding resin-impregnated reinforcing fibers or bundles of resin-impregnated reinforcing fiber bundle so that they pass through different positions on the partial cylindrical surfaces (65*a*) of both the anti-slip members (65) in terms of the front-to-back direction.

All the pressure vessels described above are used as a fuel hydrogen pressure vessel in a fuel cell system which comprises the fuel hydrogen pressure vessel, a fuel cell, and pressure piping for sending fuel hydrogen gas from the fuel cell pressure vessel to the fuel cell therethrough. The fuel cell system is installed in a fuel cell motor vehicle. The fuel cell system is also used in a cogeneration system.

Moreover, all the pressure vessels descried above are used as a natural gal pressure vessel in a natural gas supply system which comprises the natural gas pressure vessel and pressure piping for sending out natural gas from the natural gas pressure vessel therethrough. The natural gas supply system is used in a cogeneration system along with a generator and a generator drive device. The natural gas supply system is also used in a natural gas motor vehicle comprising an engine that runs on natural gas.

Furthermore, all the pressure vessels described above are used as an oxygen pressure vessel in an oxygen gas supply system which comprises the oxygen pressure vessel and pressure piping for sending out oxygen gas from the oxygen pressure vessel therethrough.

Incidentally, the pressure vessel according to this invention can also be used to store fluids other than the hydrogen gas, the natural gas, and the oxygen gas mentioned above. The fluids to be stored may be in either of a gas phase and a liquid phase.

INDUSTRIAL APPLICABILITY

The pressure vessel according to this invention is suitably used as a pressure vessel for storing hydrogen gas or natural gas which serves as a fuel for power generation, a pressure vessel for storing oxygen gas, or the like, for example, in the automobile industry, housing industry, military industry, aerospace industry, medical industry, etc.

The invention claimed is:

1. A pressure vessel comprising:
a plurality of vessel structures arranged and integrated with each other, the vessel structures each comprising a cylindrical liner having at least one open end thereof and a fiber reinforced resin layer covering an outer periphery of a peripheral wall of the liner,
wherein interiors of the liners of all the vessel structures are put in communication with each other, the liners of all the vessel structures form a single closed space, the pressure vessel has a mouth portion for making the closed space communicate with exterior, all the vessel structures are positioned such that the open ends of the liners thereof fall on a same side, an end plate is stationary across the open ends of the liners of all the vessel structures, the end plate is made of a single flat plate having a plurality of through holes into which the open ends of the liners are to be fitted, the open ends of the liners are fitted into the through holes, respectively, the plate and the liners are joined at portions around the through holes of the plate and the open ends of the liners, and a rim portion on an open side of a dome-shaped communicating member bulging outward is joined to a rim portion of the end plate such that the interiors of the liners are communicated with each other and the opening of the liners are closed.

2. A pressure vessel according to claim 1, wherein the liners and the plate are made of aluminum, and the liners and the plate are joined by friction agitation.

3. A pressure vessel according to claim 1, wherein the dome-shaped communicating member and the end plate are made of aluminum, and the dome-shaped communicating member and the end plate are joined by friction agitation.

4. A pressure vessel according to claim 1, wherein a reinforcing wall is stationarily in the dome-shaped communicating member.

5. A pressure vessel according to claim 1, wherein the liners have open ends at both ends, and the liners of all the vessel structures have the same length, the dome-shaped communicating members bulging outward are fixed across the ends of the liners of all the vessel structures at respective ends, and a mouth portion is formed on at least one of the dome-shaped communicating members.

6. A pressure vessel according to claim 1, wherein the liner of at least one vessel structure out of all the vessel structures has a different length.

7. A pressure vessel according to claim 1, wherein the liners of all the vessel structures have the same diameter.

8. A pressure vessel according to claim 1, wherein the liner of at least one vessel structure out of all the vessel structures has a different diameter.

9. A pressure vessel according to claim 1, further comprising a secondary fiber reinforced resin layer formed across all the vessel structures.

10. A pressure vessel according to claim 9, wherein the secondary fiber reinforced resin layer comprises: an in-plane winding fiber layer formed by winding a reinforcing fiber in parallel with an axial direction of the liners; a helical winding fiber layer formed by winding a reinforcing fiber obliquely to the axial direction of the liners; a hooped fiber layer formed by winding a reinforcing fiber perpendicularly to the axial direction of the liners; and a resin with which the fiber layers are impregnated before cured.

11. A pressure vessel according to claim 10, further comprising means for avoiding a slip while winding the reinforcing fibers for forming the in-plane winding fiber layer and the helical winding fiber layer of the secondary fiber reinforced resin layer on both ends.

12. A fuel cell system comprising:
a fuel hydrogen pressure vessel;
a fuel cell; and
a pressure piping device for sending fuel hydrogen gas from the fuel hydrogen pressure vessel to the fuel cell therethrough,
wherein the fuel hydrogen pressure vessel includes a pressure vessel according to claim 1.

13. A fuel cell motor vehicle having installed therein a fuel cell system according to claim 12.

14. A cogeneration system comprising a fuel cell system according to claim 12.

15. A natural gas supply system comprising:
a natural gas pressure vessel; and
a pressure piping device for sending out natural gas from the natural gas pressure vessel therethrough,
wherein the natural gas pressure vessel includes a pressure vessel according to claim 1.

16. A cogeneration system comprising:
a natural gas supply system according to claim 15;
a generator; and
a generator drive device.

17. A natural gas motor vehicle comprising:
a natural gas supply system according to claim 15; and
an engine for use with natural gas as a fuel.

18. An oxygen gas supply system comprising:
an oxygen pressure vessel; and
a pressure piping device for sending out oxygen gas from the oxygen pressure vessel therethrough,
wherein the oxygen pressure vessel includes a pressure vessel according to claim 1.

19. A pressure vessel according to claim 1, wherein longitdimnal axes of the liners fall on an identical imaginary horizontal plane.

* * * * *